US009923447B2

(12) United States Patent
Taniguchi et al.

(10) Patent No.: US 9,923,447 B2
(45) Date of Patent: Mar. 20, 2018

(54) POWER CONVERSION DEVICE HAVING IMPROVED NOISE CHARACTERISTICS, AND CONTROL METHOD THEREOF

(71) Applicant: KABUSHIKI KAISHA TOSHIBA, Minato-ku (JP)

(72) Inventors: Shun Taniguchi, Fuchu (JP); Kazuya Yasui, Inagi (JP); Kazuaki Yuuki, Tokorozawa (JP); Yoshitake Kamijo, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 93 days.

(21) Appl. No.: 14/894,469

(22) PCT Filed: Mar. 14, 2014

(86) PCT No.: PCT/JP2014/057010
§ 371 (c)(1),
(2) Date: Nov. 27, 2015

(87) PCT Pub. No.: WO2014/192373
PCT Pub. Date: Dec. 4, 2014

(65) Prior Publication Data
US 2016/0111951 A1    Apr. 21, 2016

(30) Foreign Application Priority Data

May 27, 2013    (JP) .................................. 2013-111321
Jun. 24, 2013    (JP) .................................. 2013-132093

(51) Int. Cl.
*H02M 1/12*    (2006.01)
*H02M 7/539*    (2006.01)
(Continued)

(52) U.S. Cl.
CPC .............. *H02M 1/12* (2013.01); *H02M 3/155* (2013.01); *H02M 7/44* (2013.01); *H02M 7/5395* (2013.01); *H02P 27/085* (2013.01)

(58) Field of Classification Search
CPC ............ H02M 1/12; H02M 1/44; H02M 7/44; H02M 7/48
See application file for complete search history.

(56) References Cited

U.S. PATENT DOCUMENTS 6,107,776 A *   8/2000  Nakazawa ............... H02P 27/08
                                                          318/254.2
6,600,295 B2    7/2003  Kanekawa et al.
(Continued)

FOREIGN PATENT DOCUMENTS

CN    102751936 A    10/2012
CN    102906993 A    1/2013
(Continued)

OTHER PUBLICATIONS

International Search Report dated Jun. 17, 2014 in PCT/JP14/57010 Filed Mar. 14, 2014.
(Continued)

*Primary Examiner* — Yusef Ahmed
(74) *Attorney, Agent, or Firm* — Oblon, McClelland, Maier & Neustadt, L.L.P.

(57) ABSTRACT

A power conversion device includes a carrier generating unit, a setting unit, a PWM signal generating unit, and a power conversion unit. The carrier generating unit generates a carrier of a particular set carrier frequency during a certain continuation time. The setting unit sets the continuation time to be random and sets one carrier frequency among a plurality of mutually-different carrier frequencies as the set carrier frequency. The PWM signal generating unit generates a PWM signal based on the carrier generated by the carrier generating unit. The power conversion unit executes
(Continued)

a power conversion based on the PWM signal and supplies converted power to a load.

9 Claims, 21 Drawing Sheets

(51) Int. Cl.
*H02M 7/5395* (2006.01)
*H02M 7/44* (2006.01)
*H02P 27/08* (2006.01)
*H02M 3/155* (2006.01)

(56) References Cited

U.S. PATENT DOCUMENTS

| | | | |
|---|---|---|---|
| 7,084,603 B2* | 8/2006 | Taguchi | H02P 25/03 318/139 |
| 7,928,686 B2* | 4/2011 | Saha | B60K 6/26 180/65.285 |
| 8,537,580 B2* | 9/2013 | Furutani | H02M 1/0845 318/400.17 |
| 8,736,220 B2* | 5/2014 | Ogawa | H02M 5/458 318/400.01 |
| 2004/0257030 A1 | 12/2004 | Taguchi et al. | |
| 2005/0140330 A1* | 6/2005 | Throngnumchai | H02P 21/05 318/807 |
| 2007/0247881 A1* | 10/2007 | Hayami | H02M 1/12 363/58 |
| 2007/0279948 A1* | 12/2007 | Shin | H02M 7/53875 363/41 |
| 2008/0089102 A1* | 4/2008 | Hayami | H02M 7/53871 363/74 |
| 2008/0117657 A1* | 5/2008 | Imazu | H02M 7/53875 363/41 |
| 2011/0115420 A1* | 5/2011 | Yamada | H02P 27/04 318/400.09 |
| 2012/0286716 A1* | 11/2012 | Ohsugi | H02P 27/08 318/494 |
| 2013/0026955 A1* | 1/2013 | Kikunaga | H02P 27/085 318/51 |
| 2013/0049666 A1* | 2/2013 | Osugi | H02P 27/08 318/503 |
| 2013/0063058 A1* | 3/2013 | Shouji | H02M 7/53875 318/400.06 |
| 2014/0232306 A1* | 8/2014 | Yasui | H02P 6/00 318/400.02 |
| 2014/0268948 A1* | 9/2014 | White | H02M 7/493 363/71 |
| 2014/0268967 A1* | 9/2014 | White | H02M 1/44 363/133 |
| 2014/0354191 A1* | 12/2014 | Nakazumi | H02P 27/085 318/3 |
| 2015/0270787 A1* | 9/2015 | Fujisaki | H02M 1/08 363/41 |
| 2015/0311800 A1* | 10/2015 | Katayama | H02M 3/158 323/235 |

FOREIGN PATENT DOCUMENTS

| | | |
|---|---|---|
| EP | 2 515 431 A2 | 10/2012 |
| JP | 3-79959 | 12/1991 |
| JP | 6-14557 | 1/1994 |
| JP | 11-220895 A | 8/1999 |
| JP | 3154965 | 4/2001 |
| JP | 2002-252970 A | 9/2002 |
| JP | 2003-324944 A | 11/2003 |
| JP | 2004-343833 A | 12/2004 |
| JP | 2006-067638 A | 3/2006 |
| JP | 2007-325406 A | 12/2007 |
| JP | 2009-303288 A | 12/2009 |
| JP | 2010-207084 A | 9/2010 |
| JP | 2012-143156 A | 7/2012 |
| JP | 2012-228058 A | 11/2012 |
| WO | WO 2011/148485 A1 | 12/2011 |

OTHER PUBLICATIONS

Extended European Search Report dated Jul. 19, 2016 in Patent Application No. 14803567.8.

* cited by examiner

POWER CONVERSION DEVICE HAVING IMPROVED NOISE CHARACTERISTICS, AND CONTROL METHOD THEREOF

CROSS-REFERENCE TO RELATED APPLICATIONS

This application is national stage application of International Application No. PCT/JP2014/057010, filed Mar. 14, 2014, which designates the United States, incorporated herein by reference, and which claims the benefit of priority from Japanese Patent Application No. 2013-111321, filed May 27, 2013 and Japanese Patent Application No. 2013-132093, filed Jun. 24, 2013, the entire contents of which are incorporated herein by reference.

FIELD

Embodiments described herein relate generally to a power conversion device, a control method thereof, a rotation sensorless control device, and a control method thereof.

BACKGROUND

A PWM power conversion device has been disclosed in Patent Literature 1 which changes the frequency of a carrier with respect to time for reducing an electromagnetic noise of the PWM power conversion device. In addition, in Patent Literature 2, a technology for reducing an electromagnetic noise caused by PWM harmonics by distributing harmonic components of the PWM by changing the carrier frequency in accordance with a random number has been disclosed. Furthermore, in Patent Literature 3, a technology has been disclosed which determines the occurrence probability of each carrier frequency such that the frequency distribution characteristic of harmonics is flat when a plurality of carrier frequencies are changed.

In addition, in a permanent magnet synchronous motor (PMSM) rotation sensorless control process in which a PMSM is controlled without using a rotation sensor, in a low-speed area in which an induced voltage is low, in order to estimate a rotation angle using motor core saliency, a system detecting a current response by overlapping high-frequency voltages is widely used.

However, it is known that an electromagnetic noise occurs according to the overlapping high-frequency voltages, and, in order to reduce the occurring electromagnetic noise, a technology for switching (changing) the frequency of the overlapping high-frequency voltages with respect to time has been proposed (for example, see Patent Literature 4).
Patent Literature 2: Japanese Patent Gazette No. 3154965
Patent Literature 3: Japanese Laid-open Patent Publication No. 2009-303288
Patent Literature 4: Japanese Laid-open Patent Publication No. 2004-343833

However, it has been disclosed through an inventor's experiment and the like that a component of an average of frequencies before and after the switch (change) is generated when the carrier frequency is switched (changed).

Thus, in order to reduce the influence of the carrier frequency of a PWM signal used for a PWM power conversion, in a case where a plurality of carrier frequencies are used in a switched manner, as the number of times of the switching increases, the component of the average frequency increases, and thus, a desired frequency spectrum distribution is not realized, and it is difficult to avoid mechanical resonance, whereby there is a concern that an electromagnetic noise occurs.

In addition, in a case where a plurality of overlapping high-frequencies are used in a switched manner so as to reduce the influence of overlapping high-frequencies overlapping a PWM signal used for a PWM power conversion, as the number of times of the switching increases, the component of the average frequency increases, and there is a concern that it is difficult to realize a flat frequency spectrum distribution. Particularly, generally, there is a restriction on the range of the overlapping high-frequencies that can be selected. Thus, due to a selection made only in a narrow range, the component of the average frequency increases, and there is a concern that an electromagnetic noise occurs.

The present invention is made in consideration of the description presented above, and an object thereof is to provide a power conversion device, a control method thereof, a rotation sensorless control device, a control method thereof, and a control program capable of reducing an electromagnetic noise in a PWM control process.

DETAILED DESCRIPTION

In general, according to one embodiment, a power conversion device comprises a carrier generating unit, a setting unit, a PWM signal generating unit, and a power conversion unit. The carrier generating unit generates a carrier of a particular set carrier frequency during a certain continuation time. The setting unit sets the continuation time to be random and sets one carrier frequency among a plurality of mutually-different carrier frequencies as the set carrier frequency. The PWM signal generating unit generates a PWM signal based on the carrier generated by the carrier generating unit. The power conversion unit executes a power conversion based on the PWM signal and supplies converted power to a load.

Next, embodiments will be described in detail with reference to the drawings.

[1] First Embodiment

Figure 1:
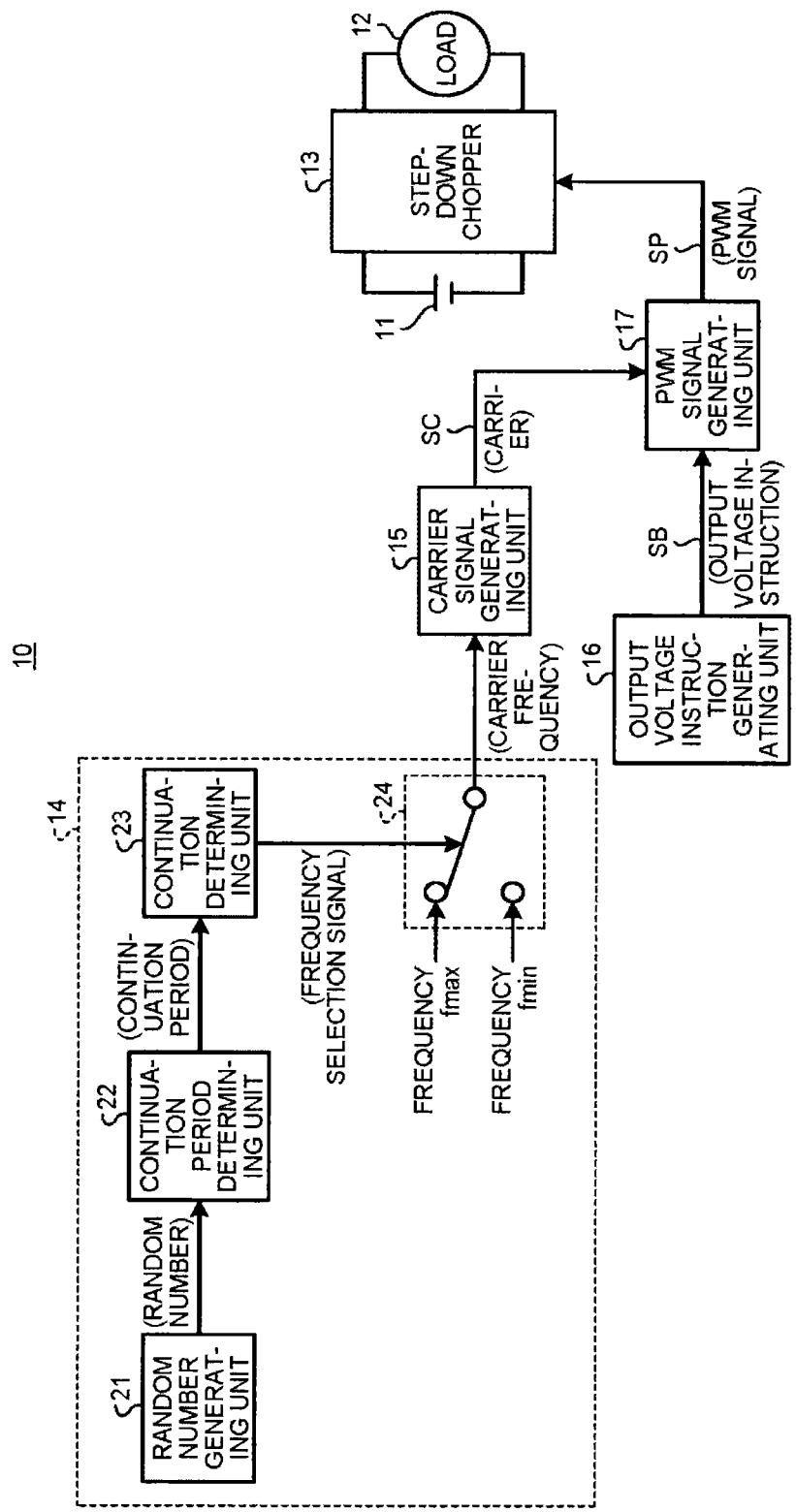
FIG. 1 is an outline configuration block diagram of a PWM power conversion device according to a first embodiment.

FIG. 1 is an outline configuration block diagram of a PWM power conversion device according to a first embodiment.

a PWM power conversion device 10, when being largely divided, includes: a step-down chopper 13 serving as a power conversion unit that drops an input DC voltage from a DC power supply 11 and outputs a resultant voltage to a load 12 as a drive voltage; a carrier frequency calculating unit 14 that calculates a carrier frequency and outputs a carrier frequency signal; a carrier signal generating unit 15 that generates a carrier signal having a carrier frequency corresponding to the carrier frequency signal; an output voltage instruction generating unit 16 that generates and outputs an output voltage instruction signal; and a PWM signal generating unit 17 that outputs a PWM signal to the step-down chopper 13 based on an input carrier signal and an output voltage instruction signal.

In the configuration described above, the carrier frequency calculating unit 14, the carrier signal generating unit 15, the output voltage instruction generating unit 16, and the PWM signal generating unit 17 configure a control unit 18 that controls a PWM power conversion.

The carrier frequency calculating unit 14 includes: a random number generating unit 21 that generates a random number; a continuation period determining unit 22 that determines a continuation period (continuation time) based on the value of an input random number and outputs continuation period data (continuation time data); a continuation determining unit 23 that executes a continuation determination based on input continuation period data and outputs a frequency selection signal; and a frequency selecting unit 24 that outputs one of a maximal carrier frequency fmax that is a highest frequency among frequencies settable as a carrier frequency and a minimal carrier frequency fmin that is a lowest frequency among the frequencies settable as a carrier frequency as a carrier frequency signal based on the frequency selection signal.

Figure 2:
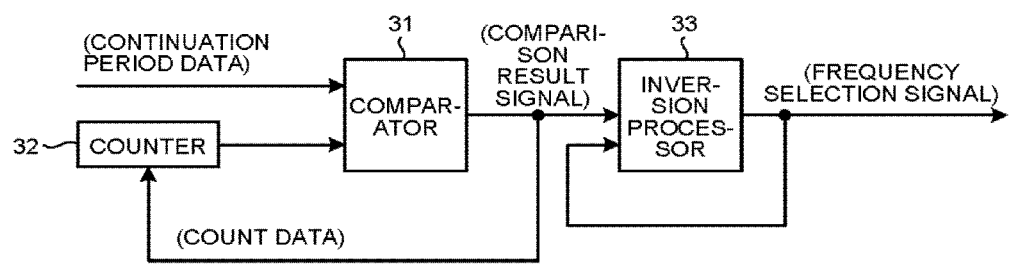
FIG. 2 is an outline configuration block diagram of a continuation determining unit.

FIG. 2 is an outline configuration block diagram of the continuation determining unit.

The continuation determining unit 23 includes: a comparator 31 that has continuation period data and count data being input thereto, determines whether or not the value of the continuation period data and the value of the count data match each other, and outputs a comparison result signal; a counter 32 that is reset in a case where the comparison result signal represents matching, increases the count value in a no matching state of the comparison result signal, and outputs a resultant count value as count data; and an inversion processor 33 that has a comparison result signal and a frequency selection signal being input thereto and inverts the frequency selection signal in a case where the comparison result signal and the frequency selection signal do not match each other.

Next, an operation according to the first embodiment will be described.

First, the random number generating unit 21 of the carrier frequency calculating unit 14 generates a random number value and outputs the generated random number value to the continuation period determining unit 22. Here, the random number generating unit 21 calculates a pseudo random number and outputs the pseudo random number as a random number value or outputs a random number value by referring to a random number table.

As a result, the continuation period determining unit 22 determines the continuation period of the selected carrier frequency based on the input random number and outputs the determined continuation period as continuation period data. More specifically, the continuation period is calculated using one period of the carrier as the reference by using Equation (1).

continuation period=one period of carrier×random number value (1)

The continuation determining unit 23 executes a continuation determination based on the input continuation period data and outputs a frequency selection signal. In this first embodiment, since the carrier frequency is one of the maximal carrier frequency fmax and the minimal carrier frequency fmin of two kinds, the frequency selection signal is binary data having one value of "0" and "1". Accordingly, a frequency selection signal corresponding to one of the maximal carrier frequency fmax and the minimal carrier frequency fmin is output to the frequency selecting unit 24 in accordance with the value of the continuation period data.

The frequency selecting unit 24 outputs the carrier frequency that is one of the maximal carrier frequency fmax and the minimal carrier frequency fmin based on the frequency selection signal exclusively as a carrier frequency signal.

As a result, the carrier signal generating unit 15 generates a carrier signal of a frequency (in this first embodiment, one of the maximal carrier frequency fmax and the minimal carrier frequency fmin) corresponding to the carrier frequency signal and outputs the generated carrier signal to the PWM signal generating unit 17.

Meanwhile, the output voltage instruction generating unit 16 generates an output voltage instruction signal (=corresponding to a fundamental wave in the PWM control process) corresponding to the output voltage of the step-down chopper 13 and outputs the generated output voltage instruction signal to the PWM signal generating unit 17.

As a result, the PWM signal generating unit 17 outputs a PWM signal to the step-down chopper 13 based on the input carrier signal and the output voltage instruction signal.

The step-down chopper 13 drops an input DC voltage input from the DC power supply 11 based on the PWM signal and outputs a resultant voltage to the load 12 as a drive voltage, whereby the load 12 is driven.

Next, a specific operation will be described.

Figure 3:
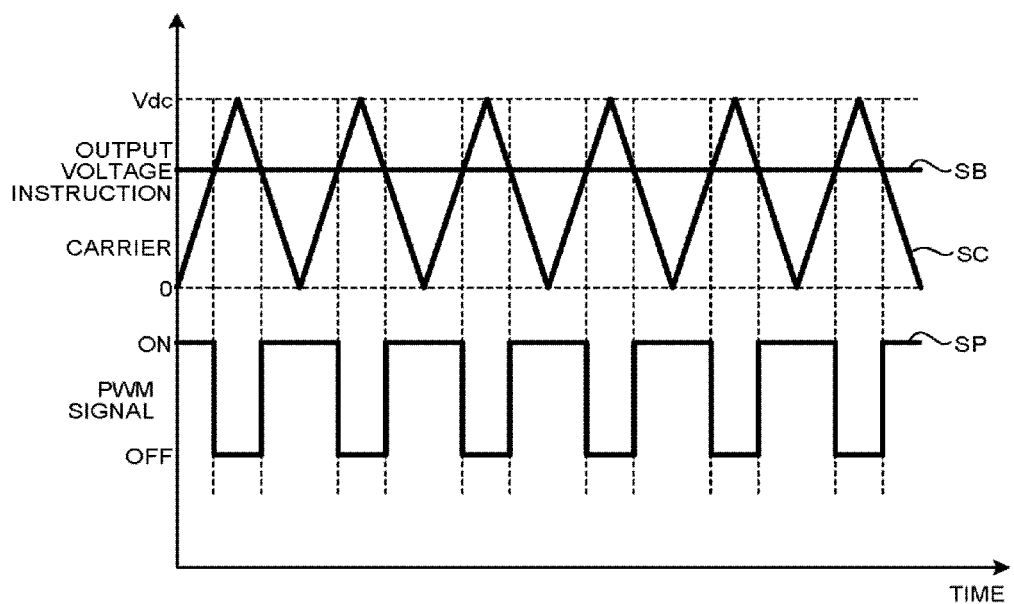
FIG. 3 is a timing diagram in the first embodiment.

FIG. 3 is a timing diagram in the first embodiment.

As illustrated in FIG. 3, when the DC power supply voltage of the PWM signal generating unit 17 is Vdc [V], the carrier signal SC that is generated by the carrier signal generating unit 15 is a triangular wave transiting between two voltage levels of zero [V] and the DC power supply voltage Vdc [V].

On the other hand, the voltage of the output voltage instruction signal SB is constant.

As a result, the PWM signal SP generated by the PWM signal generating unit 17 is at the "H" level in a case where the carrier signal SC<the output voltage instruction signal SB and is at the "L" level in a case where the carrier signal SC≥the output voltage instruction signal SB.

Figure 4:
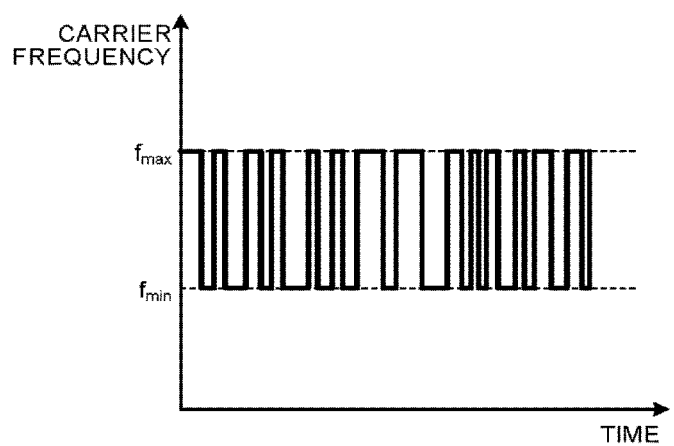
FIG. 4 is an explanatory diagram of a switching state of a carrier frequency.

FIG. 4 is an explanatory diagram of a switching state of the carrier frequency.

As illustrated in FIG. 4, according to this first embodiment, based on the random number generated by the random number generating unit 21, the continuation period in case where the frequency (set carrier frequency) of the carrier signal SC reaches the maximal carrier frequency fmax and the continuation period in case where the frequency (set carrier frequency) of the carrier signal SC reaches the minimal carrier frequency fmin are randomly changed.

According to this first embodiment, since the continuation period of the carrier wave of the same frequency changes each time, the component of the average frequency in the carrier frequency selection range can be decreased.

In addition, according to this first embodiment, by changing the continuation period in accordance with a random number value, there is no regularity of a change of the continuation period of the carrier of the same frequency, and accordingly, there is no occurrence of audible sense of incongruity accompanied with the change of the continuation period.

In the description presented above, while a random number is generated by the random number generating unit 21, and the continuation period is changed in accordance with the random number, for example, by changing the continuation period in accordance with a sinusoidal wave, the component of the average frequency in the carrier frequency selection range can be reduced.

In the frequency spectrum distribution of harmonics generated according to the carrier, the peak of a harmonic component generated according to each carrier frequency appears within the carrier frequency selection range.

Regarding the selection range of the carrier frequency, the upper limit frequency fmax is limited by the control calculation processing time of a microcomputer, and the lower limit frequency fmin is limited by the degradation of the controllability according to a control delay. Accordingly, a wide frequency band from the upper limit frequency fmax to the lower limit frequency fmin cannot be taken.

Figure 5:
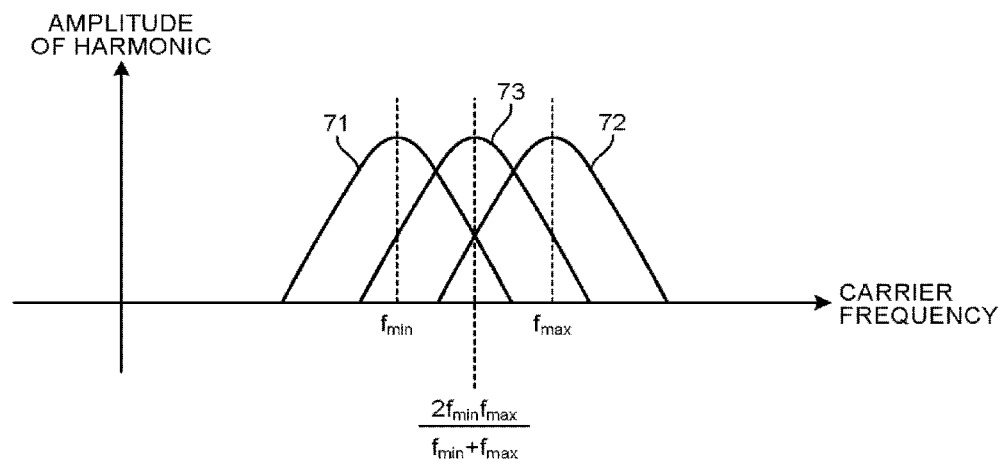
FIG. 5 is an explanatory diagram of a relation between a carrier frequency and a harmonic component.

FIG. 5 is an explanatory diagram of a relation between the carrier frequency and a harmonic component.

In other words, as illustrated in FIG. 5, a peak 71 of a harmonic component according to the minimal carrier frequency fmin that is the lower limit carrier frequency, and a peak 72 of a harmonic component according to the maximal carrier frequency fmax that is the upper limit carrier frequency, and a peak 73 of a harmonic component accompanied with the transition of the frequency overlap each other. Thus, in the carrier frequency selection range, in order to the expand the range of the dispersion as much as possible, it is more preferable to select two frequencies that are the minimal carrier frequency fmin at the lower limit of the carrier frequency selection range and the maximal carrier frequency fmax at the upper limit thereof as the carrier frequency and change the continuation period for the dispersion.

In addition, it is preferable that the continuation period is an integer number of times of the half period of the carrier period in a case where the carrier is a triangular wave and is an integer number of times of one period of the carrier in a case where the carrier is a saw-tooth wave such that, as possibly as can be, the update timing of the carrier frequency is a peak portion or a valley portion of the carrier wave. In such a case, the premise of the PWM that an average of the output voltage between the peak portion and the valley portion of the carrier wave is the voltage value of an output voltage instruction is maintained, and an occurrence of an error in the output voltage according to a change in the carrier frequency can be prevented.

Figure 6:
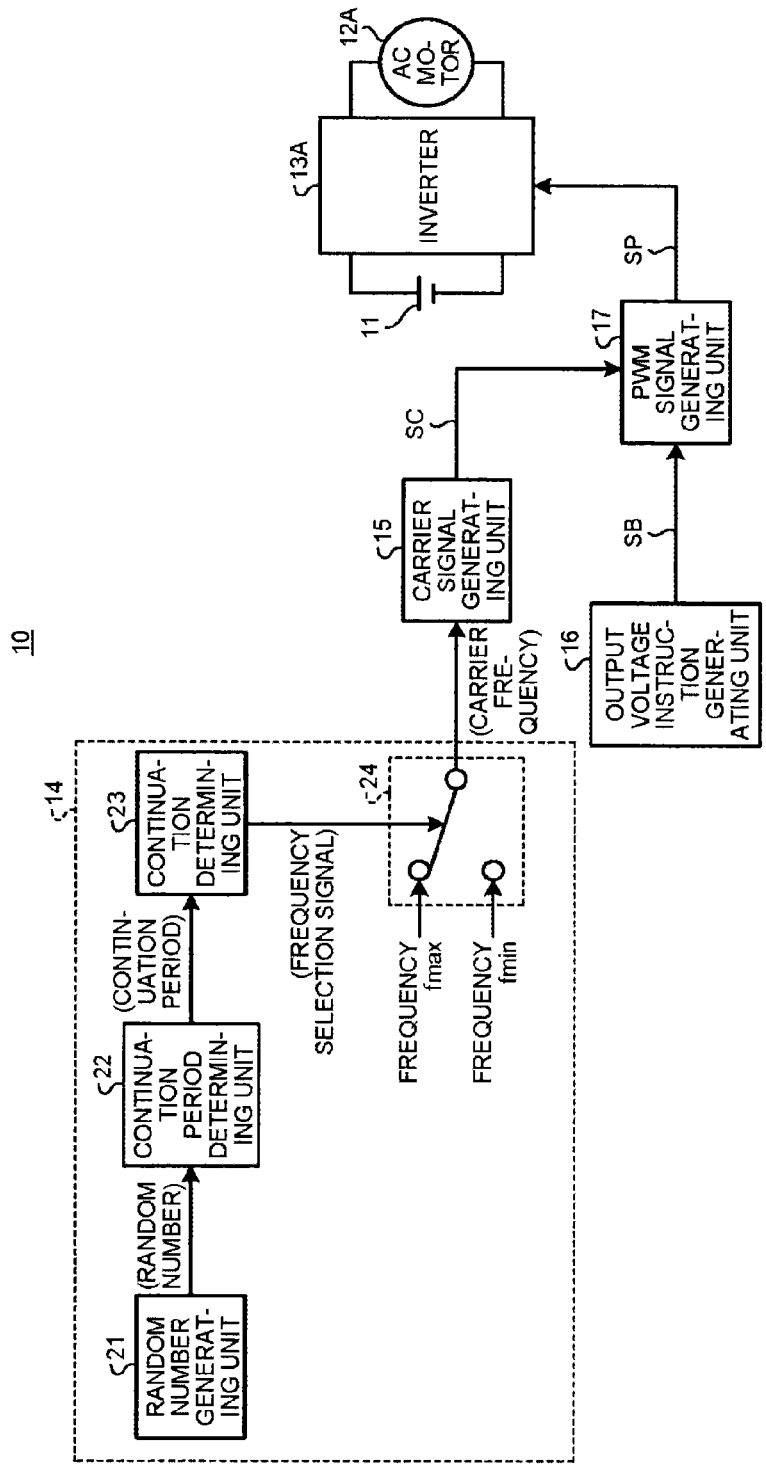
FIG. 6 is an explanatory diagram of a modified example in the first embodiment.

FIG. 6 is an explanatory diagram of a modified example of the first embodiment.

In this first embodiment, while the control of the load 12 using the step-down chopper 13 has been illustrated, for example, as illustrated in FIG. 6, in a case where an AC motor 12A is controlled using an inverter 13A or the like, in the case of a PWM power conversion device, similarly, the effect of the distribution of the harmonic components can be acquired, whereby an occurrence of mechanical resonance and the like can be suppressed.

[2] Second Embodiment

Figure 7:
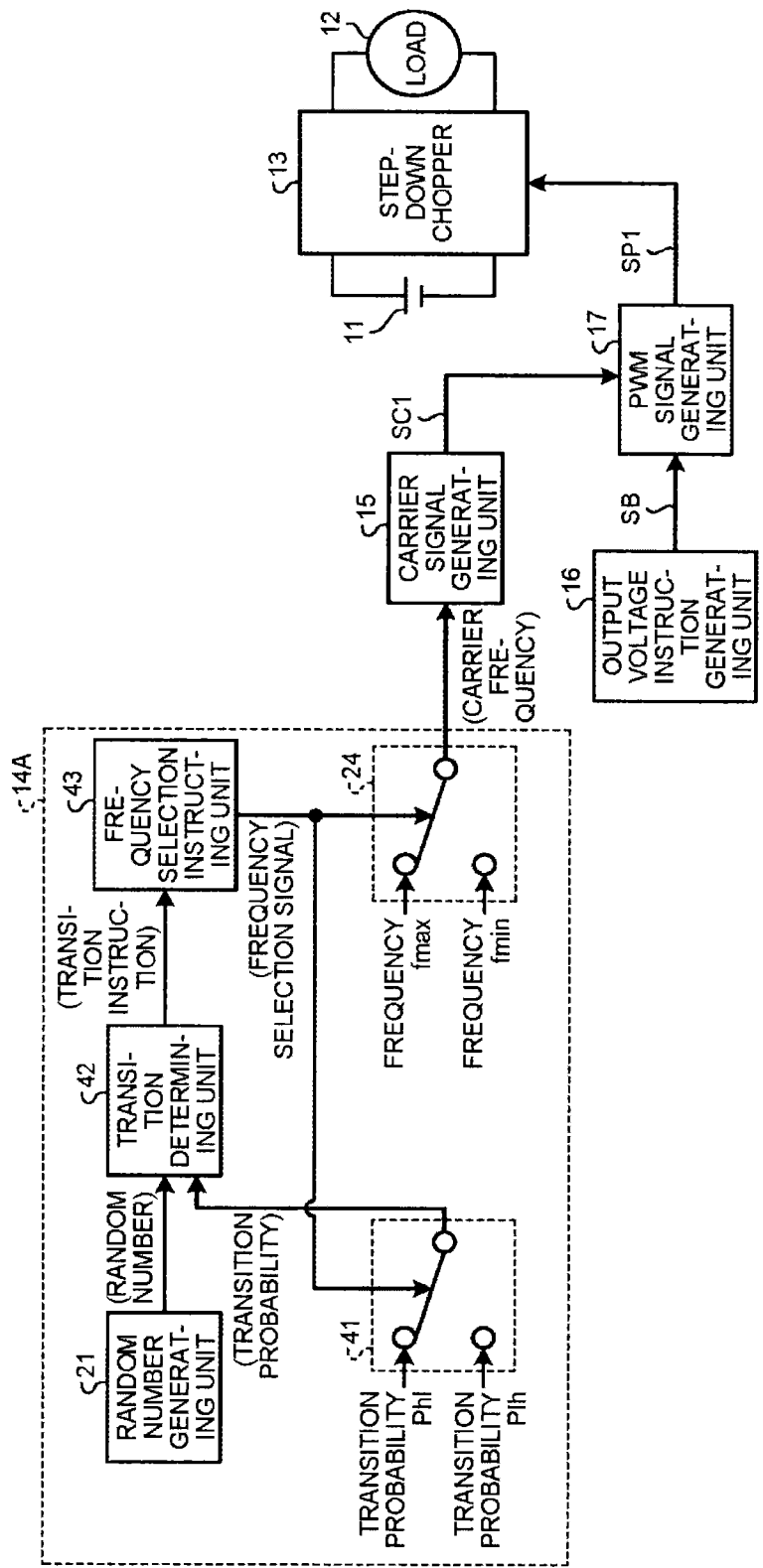
FIG. 7 is an outline configuration block diagram of a PWM power conversion device according to a second embodiment.

FIG. 7 is an outline configuration block diagram of a PWM power conversion device according to a second embodiment.

In FIG. 7, the same reference numeral is attached to each same portion as that of the first embodiment illustrated in FIG. 1.

In this second embodiment, there is a difference from the first embodiment that, while the continuation period in which the carrier of the same frequency is continuously used for the generation of a PWM signal is set simply based on a random number value in the first embodiment, in this second embodiment, a carrier frequency calculating unit is included which checks whether or not a random value satisfies a transition condition based on a transition probability value by using the random number value and the transition probability value. In such a case, by using a plurality of transition probability values, it is determined whether or not a transition from a certain carrier frequency to another carrier frequency is made, and accordingly, the carrier frequency can be changed more uniformly, whereby the frequencies of the acquired harmonic components can be uniformly dispersed.

A carrier frequency calculating unit 14A of the PWM power conversion device 10, when being largely divided, as illustrated in FIG. 7 includes: a random number generating unit 21 that generates a random number; a transition probability selecting unit 41 that selects one of a plurality of transition probability values set in advance based on a frequency selection signal and outputs the selected transition probability value; a transition determining unit 42 that executes a transition determination of whether or not a frequency transition is made based on an input random number value and an input transition probability value and outputs a transition instruction signal; a frequency selection instructing unit 43 that outputs a frequency selection signal based on the input transition instruction signal; and a frequency selecting unit 24 that exclusively outputs one of a maximal carrier frequency fmax and a minimal carrier frequency fmin, which is the carrier frequency, as a carrier frequency signal based on the frequency selection signal.

In this second embodiment, since used carrier frequencies are the maximal carrier frequency fmax and the minimal carrier frequency fmin of two kinds, two transition probability values are used which include a transition probability value Phl that is a probability value for a transition of the carrier frequency from the maximal carrier frequency fmax to the minimal carrier frequency fmin and a transition probability value Plh that is a probability value for a transition of the carrier frequency from the minimal carrier frequency fmin to the maximal carrier frequency fmax.

Next, the operation according to the second embodiment will be described.

First, the random number generating unit 21 of the carrier frequency calculating unit 14A generates a random number value and outputs the generated random number value to the transition determining unit 42. Here, the random number generating unit 21, similarly to the first embodiment, calculates a pseudo random number and outputs the pseudo random number as a random number value or outputs a random number value to the transition determining unit 42 by referring to a random number table.

In parallel with this, the transition probability selecting unit 41 selects one of a plurality of the transition probability values Phl and Plh set in advance based on the frequency selection signal output by the frequency selection instructing unit 43 and outputs the selected transition probability value to the transition determining unit 42.

More specifically, in a case where the frequency selection signal output by the frequency selection instructing unit 43 corresponds to the maximal carrier frequency fmax, the transition probability value Phl that is a probability value for a transition of the carrier frequency from the maximal carrier frequency fmax to the minimal carrier frequency fmin is output to the transition determining unit 42.

On the other hand, in a case where the frequency selection signal output by the frequency selection instructing unit 43 corresponds to the minimal carrier frequency fmin, the transition probability value Plh that is a probability value for a transition of the carrier frequency from the minimal carrier frequency fmin to the maximal carrier frequency fmax is output to the transition determining unit 42.

As a result, the transition determining unit 42 executes a transition determination of whether or not a frequency transition is made based on the random number value and the transition probability value that have been input and outputs a transition instruction signal to the frequency selection instructing unit 43.

More specifically, for example, in a case where the input random number value input with the random number value being set to be in the range of "0" to "1" is a transition probability value (for example, a transition probability value Phl=0.45) or less, a transition instruction signal for a transition to a carrier frequency other than the current carrier frequency is output to the frequency selection instructing unit 43.

The frequency selection instructing unit 43 outputs a frequency selection signal to the frequency selecting unit 24 based on the input transition instruction signal.

As a result, the frequency selecting unit 24 outputs one of the maximal carrier frequency fmax and the minimal carrier frequency fmin to the carrier signal generating unit 15 as a carrier frequency signal based on the input frequency selection signal.

The carrier signal generating unit 15 generates a carrier signal of a frequency (in this second embodiment, one of the maximal carrier frequency fmax and the minimal carrier frequency fmin) corresponding to the carrier frequency signal and outputs the generated carrier signal to the PWM signal generating unit 17.

Meanwhile, the output voltage instruction generating unit 16 generates an output voltage instruction signal (=corresponding to a fundamental wave in the PWM control process) corresponding to the output voltage of the step-down chopper 13 and outputs the generated output voltage instruction signal to the PWM signal generating unit 17.

As a result, the PWM signal generating unit 17 outputs a PWM signal to the step-down chopper 13 based on the input carrier signal and the output voltage instruction signal.

The step-down chopper 13 drops an input DC voltage input from the DC power supply 11 based on the PWM signal and outputs a resultant voltage to the load 12 as a drive voltage, whereby the load 12 is driven.

Figure 8:
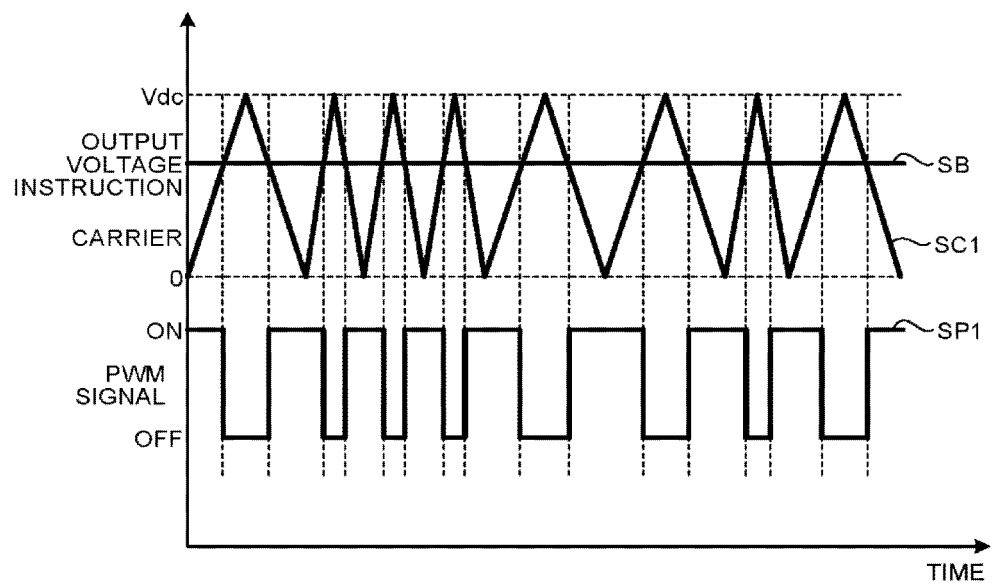
FIG. 8 is a timing diagram in the second embodiment.

FIG. 8 is a timing diagram of the second embodiment.

According to the configuration described above, the carrier frequency calculating unit 14A, similarly to the first embodiment, outputs a carrier signal SC1 in which the continuation period of the maximal carrier frequency fmax or the minimal carrier frequency fmin is randomly changed, and a PWM signal SP1 as illustrated in FIG. 8 is output by the PWM signal generating unit 17.

In addition, in this second embodiment, in addition to the effects of the first embodiment, by using an appropriate transition probability value, the transition state of the carrier frequency can be adjusted, and accordingly, a desired frequency spectrum distribution of harmonics can be easily generated.

Here, the adjustment of the frequency spectrum distribution of harmonics based on a transition probability value will be described.

In this second embodiment, there are only four operation modes.
(1) Continuation of Minimal Carrier Frequency fmin
(2) Continuation of Maximal Carrier Frequency fmax
(3) Transition from Minimal Carrier Frequency fmin to Maximal Carrier Frequency fmax
(4) Transition from Maximal Carrier Frequency fmax to Minimal Carrier Frequency fmin FIG. 9 is an explanatory diagram of the operation according to the second embodiment.

Figure 9:
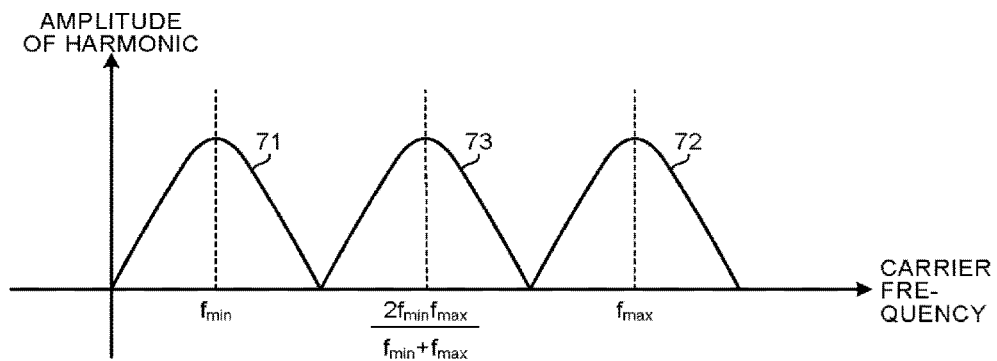
FIG. 9 is an explanatory diagram of the operation in the second embodiment.

In this case, as frequency spectrum distributions of generated harmonics, as illustrated in FIG. 9, there are three kinds of frequency spectrum distributions. Since both (3) a transition from the minimal carrier frequency fmin to the maximal carrier frequency fmax and (4) a transition from the maximal carrier frequency fmax to the minimal carrier frequency fmin correspond to 73, the description thereof will be commonly presented.

Thus, these three kinds of frequency spectrum distributions will be used for the description.

The amplitudes of harmonic components at the peaks of the frequency spectrum distributions can be represented in Equations (2) to (4).

$$\text{Amplitude of Harmonic of } f_{min} \text{ Component} = \frac{f_{max}}{f_{min}} \frac{P_{h1}(1-P_{1h})}{f_{min}P_{1h}+f_{max}P_{h1}} C \quad (2)$$

$$\text{Amplitude of Harmonic of } f_{max} \text{ Component} = \frac{f_{min}}{f_{max}} \frac{P_{1h}(1-P_{h1})}{f_{min}P_{1h}+f_{max}P_{h1}} C \quad (3)$$

$$\text{Amplitude of Harmonic of } \frac{2f_{min}f_{max}}{f_{min}+f_{max}} \text{ Component} = \frac{(f_{min}+f_{max})^2}{2f_{min}f_{max}} \frac{P_{h1}P_{1h}}{f_{min}P_{1h}+f_{max}P_{h1}} C \quad (4)$$

Here, while a constant C changes according to a modulation rate, a dispersion range, and the like, the constant C is common to three dispersions.

Based on the description presented above, in this second embodiment, the frequency spectrum distributions of harmonics are adjusted.

For example, in a case where the harmonic component of the minimal carrier frequency fmin is desired to be increased, the transition probability value Phl for a transition of the carrier frequency from the maximal carrier frequency fmax to the minimal carrier frequency fmin may be increased, or the transition probability value Plh for a transition of the carrier frequency from the minimal carrier frequency fmin to the maximal carrier frequency fmax may be decreased.

In addition, in a case where the harmonic component of the maximal carrier frequency fmax is desired to be increased, the transition probability value Phl for a transition of the carrier frequency from the maximal carrier frequency fmax to the minimal carrier frequency fmin may be decreased, or the transition probability value Plh for a transition of the carrier frequency from the minimal carrier frequency fmin to the maximal carrier frequency fmax may be increased.

Furthermore, in a case where a harmonic component generated according to a transition from the minimal carrier frequency fmin to the maximal carrier frequency fmax or a transition from the maximal carrier frequency fmax to the minimal carrier frequency fmin is desired to be increased, the transition probability value Phl for a transition of the carrier frequency from the maximal carrier frequency fmax to the minimal carrier frequency fmin or the transition probability value Plh for a transition of the carrier frequency from the minimal carrier frequency fmin to the maximal carrier frequency fmax may be increased. In this way, any kind of frequency spectrum distribution can be generated.

However, as also described in the first embodiment, generally, a wide selection range of the carrier frequency cannot be taken.

Thus, as illustrated in FIG. 5, a peak 71 of a harmonic component according to the minimal carrier frequency fmin that is the lower limit carrier frequency of the carrier frequency selection range, and a peak 72 of a harmonic component according to the maximal carrier frequency fmax that is the upper limit carrier frequency of the carrier frequency selection range, and a peak 73 of a harmonic component resulted from a transition of the carrier frequency overlap each other.

Figure 10:
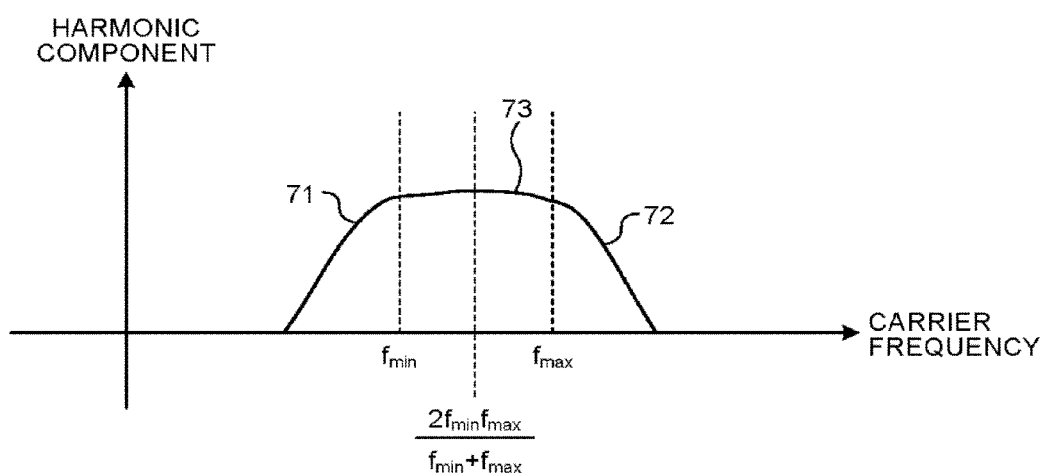
FIG. 10 is an explanatory diagram of effects in the second embodiment.

FIG. 10 is an explanatory diagram of effects of the second embodiment.

Thus, by configuring the peak 73 resulted from a transition of the carrier frequency to be smaller than the peak 71 of the harmonic component according to the minimal carrier frequency fmin and the peak 72 of the harmonic component according to the maximal carrier frequency fmax, as illustrated in FIG. 10, the harmonic can be formed to be flat as possibly as can within the selection range of the carrier frequency.

Also in this second embodiment, similarly to the first embodiment, the component of the average frequency in the carrier frequency selection range can be decreased, for example, by executing a transition determination based on not a random number but a sinusoidal wave. In addition, also in this second embodiment, similarly to the first embodiment, while the control process of the load 12 that is executed by using the step-down chopper 13 has been illustrated, the effect of the distribution of the harmonic components can be similarly acquired in the case of a PWM power conversion device.

In addition, the change of the carrier frequency may be made only at the peak position or the bottom position such that the update timing of the carrier frequency is at the peak (crest) or the bottom (valley) of the carrier as possibly as can be. In such a case, the premise of the PWM that an average of the output voltage between the peak and the bottom of the carrier wave is an output voltage instruction is maintained, and an occurrence of an error in the output voltage according to a change in the carrier frequency can be prevented.

[3] Third Embodiment

In this third embodiment, there is a difference from the second embodiment described above that a transition probability/carrier frequency determining unit that determines a transition probability value and a carrier frequency based on the mechanical characteristics of the load is included.

Figure 11:
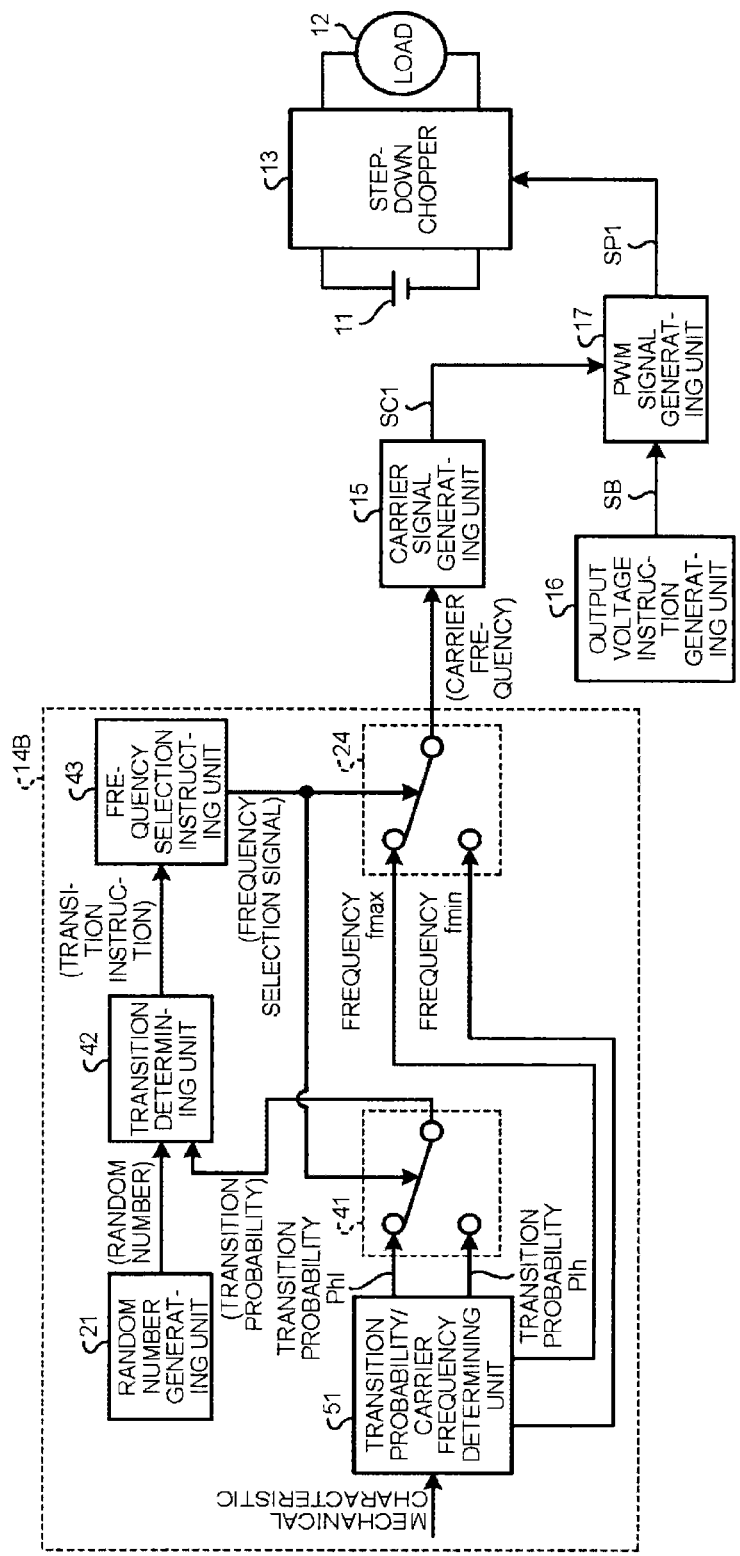
FIG. 11 is an outline configuration block diagram of a PWM power conversion device according to a third embodiment.

FIG. 11 is an outline configuration block diagram of a PWM power conversion device according to a third embodiment.

In FIG. 11, the same reference numeral is attached to each same portion as that of the second embodiment illustrated in FIG. 7.

A carrier frequency calculating unit 14B of the PWM power conversion device 10, when being largely divided, as illustrated in FIG. 11 includes: a random number generating unit 21 that generates a random number; a transition probability/carrier frequency determining unit 51 that determines transition probability values Phl and Plh and the maximal carrier frequency fmax and the minimal carrier frequency fmin based on an input mechanical characteristic of a load; a transition probability selecting unit 41 that selects one of a plurality of transition probability values set by the transition probability/carrier frequency determining unit 51 based on a frequency selection signal and outputs the selected transition probability value; a transition determining unit 42 that executes a transition determination of whether or not a frequency transition is made based on an input random value and an input transition probability value and outputs a transition instruction signal; a frequency selection instructing unit 43 that outputs a frequency selection signal based on the input transition instruction signal; and a frequency selecting unit 24 that outputs one of the maximal carrier frequency fmax and the minimal carrier frequency fmin, which are set by the transition probability/carrier frequency determining unit 51, as a carrier frequency signal based on the frequency selection signal.

Figure 12:
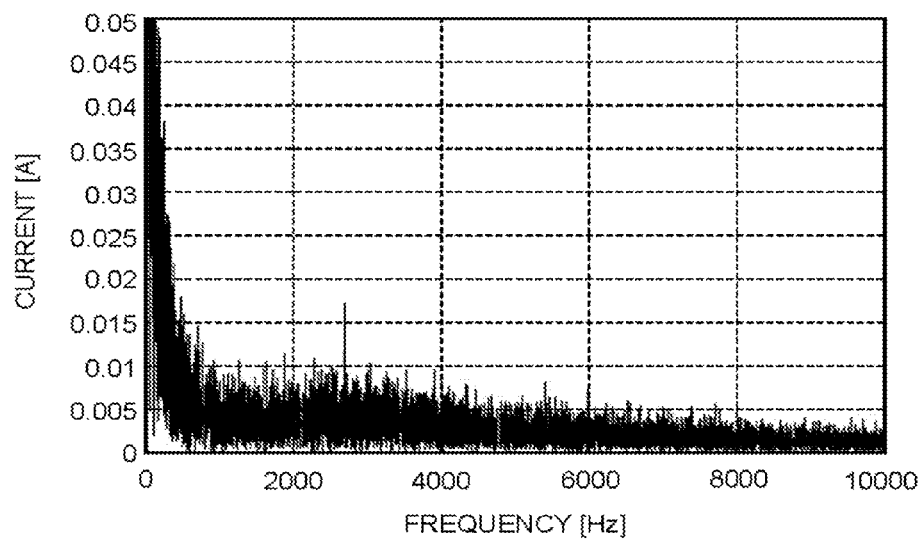
FIG. 12 is an explanatory diagram of an example of a current flowing through a load in a mechanical characteristic determination.

FIG. 12 is an explanatory diagram of an example of a current flowing through a load in a mechanical characteristic determination.

Figure 13:
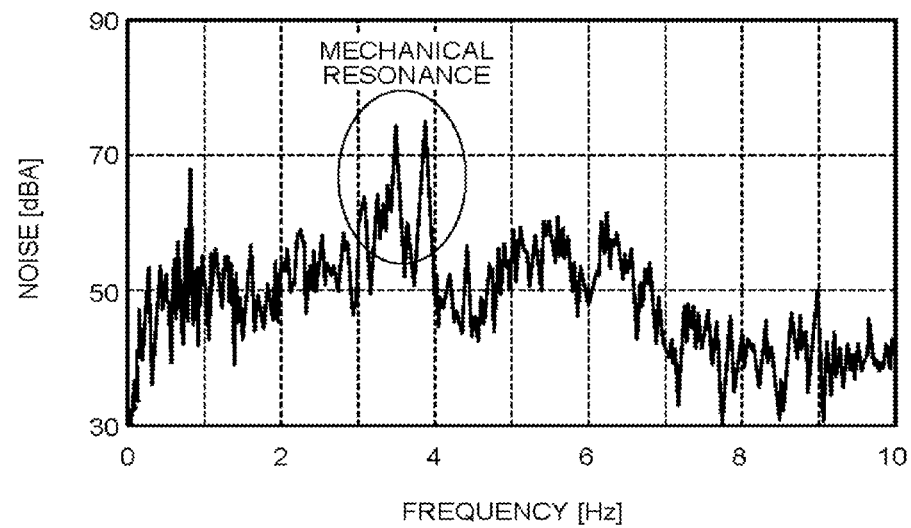
FIG. 13 is an explanatory diagram of a noise characteristic of the load in the mechanical characteristic determination.

FIG. 13 is an explanatory diagram of a noise characteristic of the load in the mechanical characteristic determination.

In the configuration of the PWM power conversion device 10 according to the third embodiment described above, the mechanical characteristic, for example, is a noise characteristic of the load illustrated in FIG. 13 in a case where a current close to a white noise as illustrated in FIG. 12 is flown through the load or is simply the frequencies (for example, 3.4 kHz and 3.9 kHz in the case illustrated in FIG. 13) of the mechanical resonance points of the load.

Figure 14:
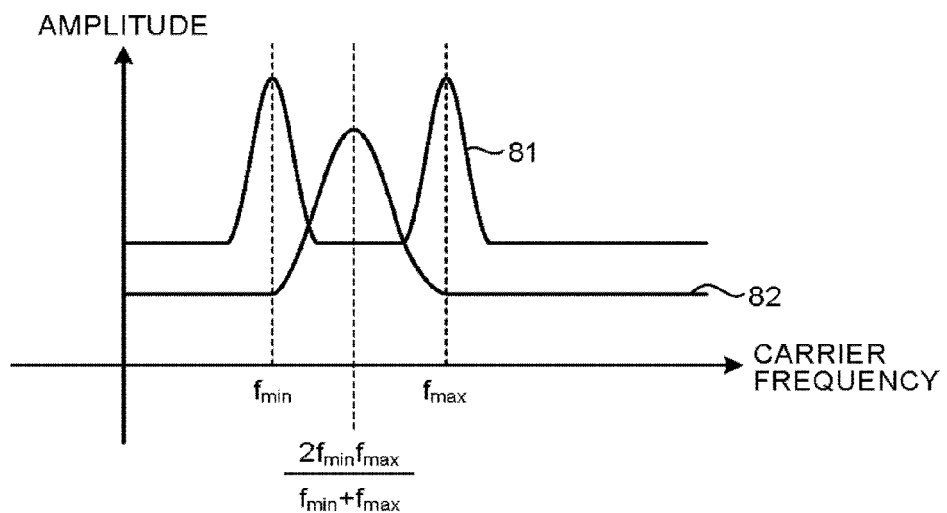
FIG. 14 is an explanatory diagram of a relation between a mechanical characteristic and a set carrier frequency.

FIG. 14 is an explanatory diagram of a relation between a mechanical characteristic and a set carrier frequency.

The transition probability/carrier frequency determining unit 51 determines the maximal carrier frequency fmax and the minimal carrier frequency fmin based on an input mechanical characteristic such that, for example, as illustrated in FIG. 14, the mechanical resonance point included in a mechanical characteristic 82 coincides with an average frequency [=2·fmin×fmax/(fmax+fmin)≈(fmax+fmin)/2] of the maximal carrier frequency fmax and the minimal carrier frequency fmin. In addition, by decreasing the transition probability values Phl and Plh, the number of times of executing a transition of the carrier frequency is suppressed, and an occurrence of a peak of harmonics at the average frequency is suppressed, whereby a frequency spectrum distribution 81 avoiding mechanical resonance is acquired.

Figure 15:
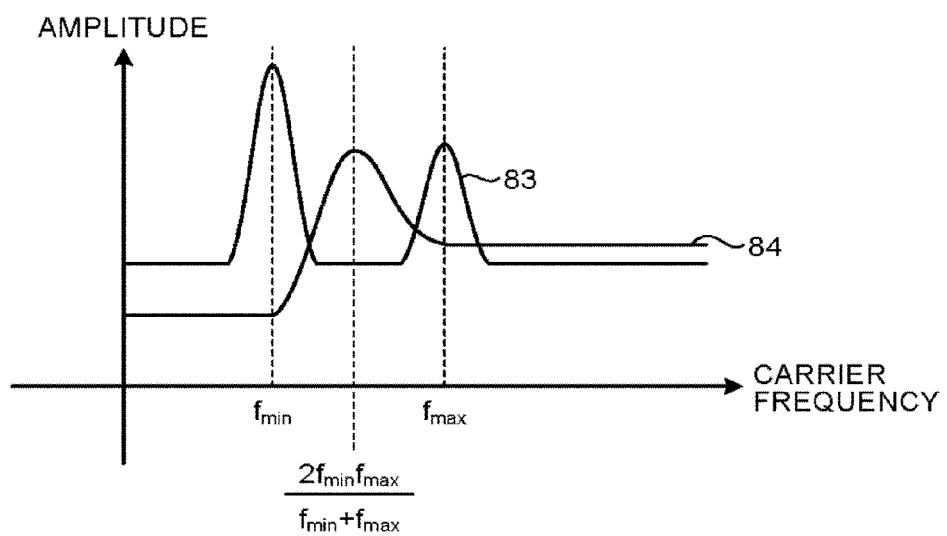
FIG. 15 is an explanatory diagram of another relation between a mechanical characteristic and a set carrier frequency.

FIG. 15 is an explanatory diagram of another relation between a mechanical characteristic and a set carrier frequency.

For example, as illustrated in FIG. 15, in the case of a mechanical characteristic 84 having a large noise at the maximal carrier frequency fmax, by configuring the transition probability value Plh for a transition of the carrier frequency from the minimal carrier frequency fmin to the maximal carrier frequency fmax to be smaller than the transition probability value Phl for a transition of the carrier frequency from the maximal carrier frequency fmax to the minimal carrier frequency fmin, the peak of the harmonic of the minimal carrier frequency fmin is larger than the peak of the harmonic of the maximal carrier frequency fmax, whereby a frequency spectrum distribution 83 avoiding mechanical resonance is acquired.

According to this third embodiment configured as described above, the mechanical resonance can be avoided, and the electromagnetic noise can be reduced.

Also in this third embodiment, similarly to the first and second embodiments, the component of the average frequency in the carrier frequency selection range can be decreased, for example, by executing a transition determination based on not a random number but a sinusoidal wave.

In addition, also in this third embodiment, similarly to the first and second embodiments, while the control process of the load 12 that is executed by using the step-down chopper 13 has been illustrated, the effect of the distribution of the harmonic components can be similarly acquired in the case of a PWM power conversion device.

Also in this third embodiment, similarly to the first and second embodiments, the mechanical resonance can be avoided, for example, by executing a transition determination based on not a random number but a sinusoidal wave.

In addition, also in the third embodiment, similarly to the first and second embodiments, while the control process of the load 12 that is executed by the step-down chopper 13 has been illustrated, for example, an inverter controlling the AC motor 12A serving as the load 12 can similarly acquire the effect of decreasing the electromagnetic noise by employing the present invention in accordance with the mechanical characteristic of the AC motor 12A.

[4] Modified Examples of First Embodiment to Third Embodiment

[4.1] First Modified Example

Figure 16:
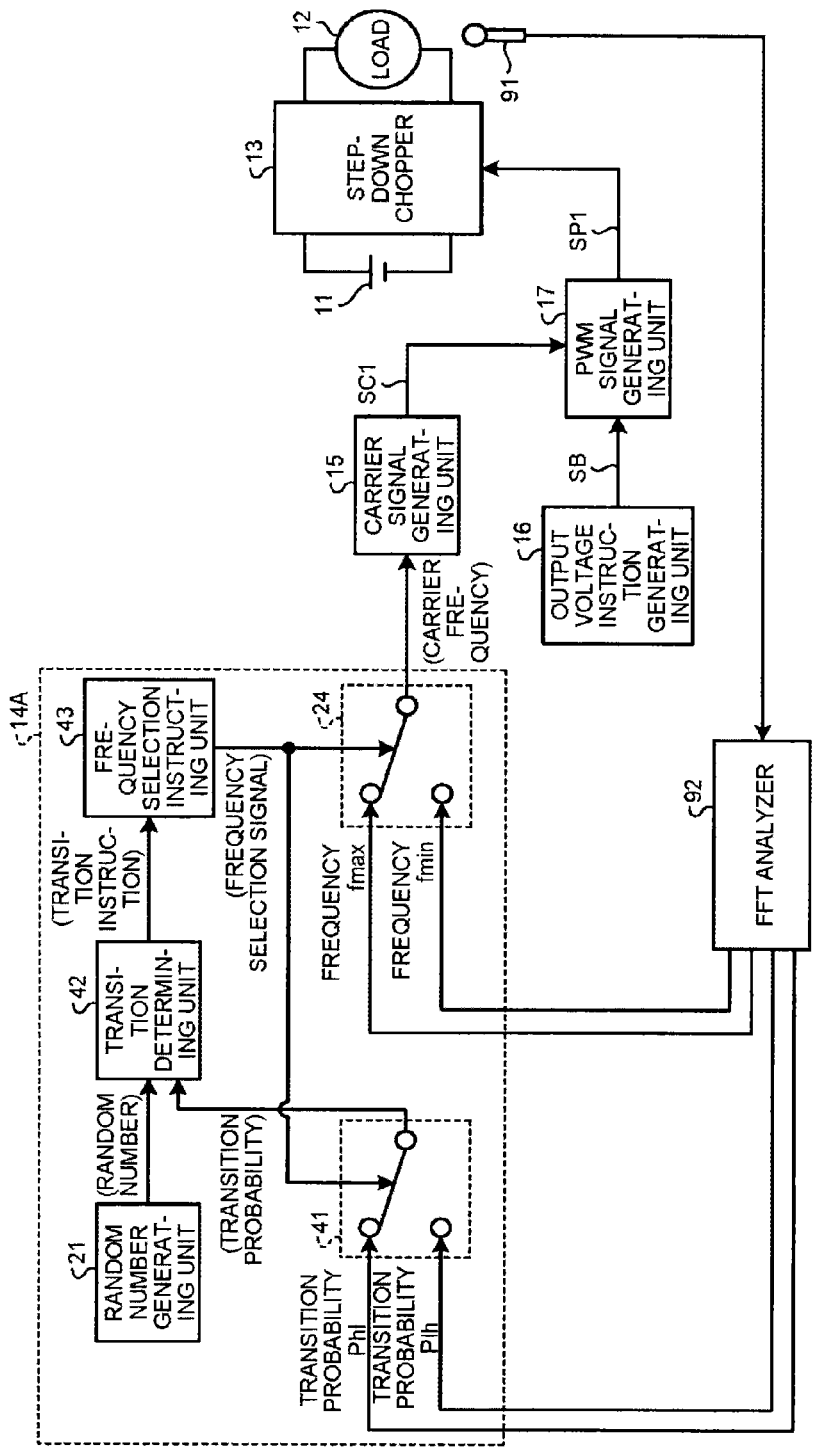
FIG. 16 is an outline configuration explanatory diagram in a first modified example.

FIG. 16 is an outline configuration explanatory diagram of a first modified example of the first to third embodiments.

In each embodiment described above, while a configuration has been employed in which the mechanical characteristic of the load is additionally input (setting), as illustrated in FIG. 16, it may be configured such that a microphone 91 used for detecting a noise is arranged near the load, an FFT analyzer 92 analyzing the output of the microphone 91 through a fast Fourier transform (FFT) is arranged, and the maximal carrier frequency fmax, the minimal carrier frequency fmin, and the carrier continuation period are determined based on a result of the FFT analysis.

[4.2] Second Modified Example

It may be configured such that, similarly to the first modified example of the first to third embodiments, an FFT analyzer is arranged, and the transition probability value Phl and the transition probability value Plh used in the second embodiment are determined based on a result of the FFT analysis.

[4.3] Third Modified Example

In the third embodiment described above, while the configuration including the transition probability/carrier frequency determining unit 51 has been employed, in the configuration of the second embodiment, the transition probability values Phl and Plh and the carrier frequencies fmax and fmin may be calculated in advance so as to avoid mechanical resonance and be set as such.

[4.4] Fourth Modified Example

The control unit of the PWM power conversion device according to each of the first to third embodiments includes a control device such as a CPU, a storage device such as a read only memory (ROM) or a RAM, an external storage device such as an HDD or a CD drive device, a display device such as a display apparatus, and an input device such as a keyboard or a mouse and can be configured by employing a hardware configuration using a general computer.

[4.5] Fifth Modified Example

The control program executed by the control unit of the PWM power conversion device according to each of the first to third embodiments may be provided in an installable form or an executable form with being recorded on a computer-readable recording medium such as a CD-ROM, a flexible disk (FD), a CD-R, or a digital versatile disk (DVD).

[4.6] Sixth Modified Example

In addition, the control program executed by the control unit of the PWM power conversion device according to each of the first to third embodiments may be configured to be provided by being stored on a computer connected to a network such as the Internet and downloaded through the network. Furthermore, the control program executed by the PWM power conversion device according to this embodiment may be configured to be provided or distributed through a network such as the Internet.

[4.7] Seventh Modified Example

The control program executed by the control unit of the PWM power conversion device according to each of the first to third embodiments may be configured to be built in a ROM or the like in advance and is provided.

[5] Fourth Embodiment

Figure 17:
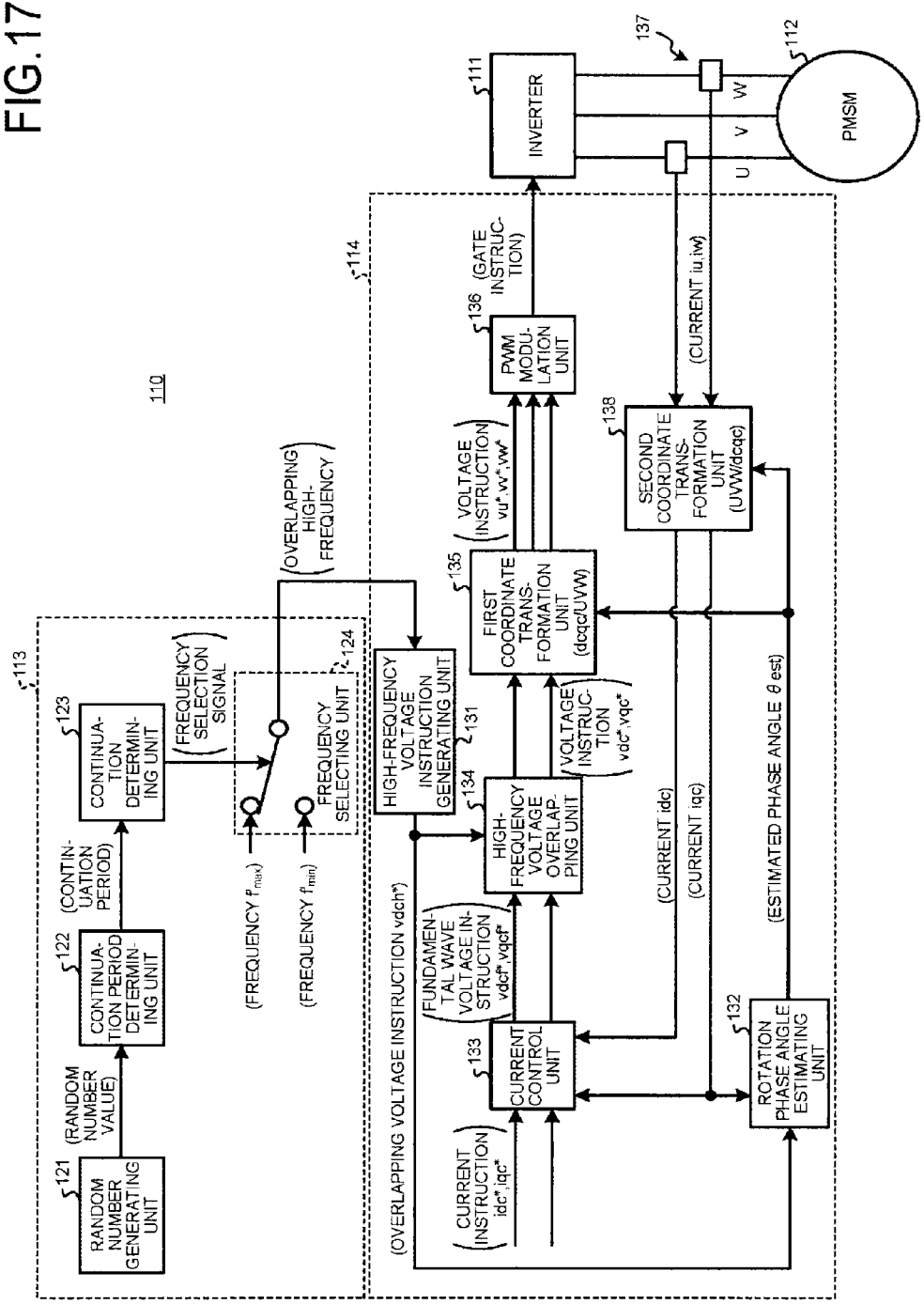
FIG. 17 is an outline configuration block diagram of a PMSM rotation sensorless control system according to a fourth embodiment.

FIG. 17 is an outline configuration block diagram of a PMSM rotation sensorless control system according to a fourth embodiment.

A PMSM rotation sensorless control system 110, when being largely divided, includes: an inverter 111 that executes a power conversion; a PMSM 112 that is driven to rotate by the inverter 111; an overlapping high-frequency calculating unit 113 that is used for calculating the frequency of a high-frequency voltage overlapping for estimating the rotation angle of the PMSM 112 using motor core saliency and setting the calculated frequency; and an inverter control unit 114 that controls the inverter 111 while allowing a high-frequency signal having the frequency set by the overlapping high-frequency calculating unit 113 to overlap a control signal. At this time, the overlapping high-frequency calculating unit 113 may be arranged inside or outside the inverter control unit 114.

The overlapping high-frequency calculating unit 113 includes: a random number generating unit 121 that generates a random number; a continuation period determining unit 122 that determines a continuation period based on the value of an input random number and outputs continuation period data; a continuation determining unit 123 that executes a continuation determination based on input continuation period data, which will be described later, and outputs a frequency selection signal; and a frequency selecting unit 124 that outputs one of a maximal overlapping high-frequency fmax that is a highest frequency among frequencies settable as an overlapping high-frequency and a minimal overlapping high-frequency fmin that is a lowest frequency among the frequencies settable as an overlapping high-frequency as an overlapping high-frequency signal based on the frequency selection signal.

Figure 18:
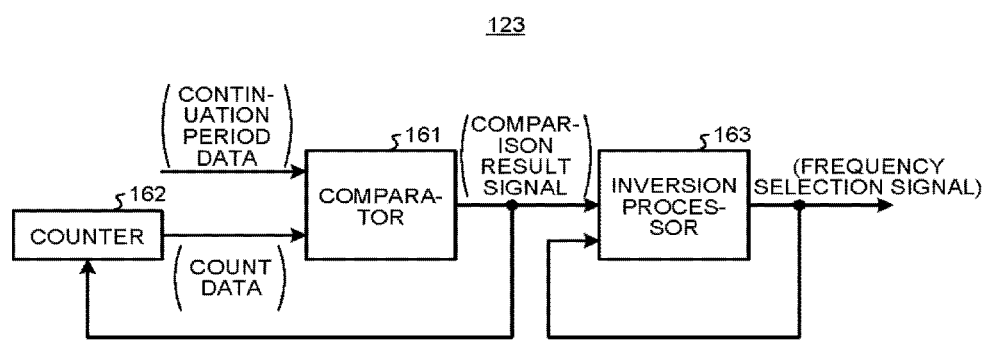
FIG. 18 is an outline configuration block diagram of a continuation determining unit.

FIG. 18 is an outline configuration block diagram of the continuation determining unit.

The continuation determining unit 123 includes: a comparator 161; a counter 162; an inversion processor 163.

The comparator 161 has continuation period data and count data being input thereto, determines whether or not the value of the continuation period data and the value of the count data match each other, and outputs a comparison result signal.

The counter 162 includes an internal memory, and a count value is stored in the memory. For example, the initial value of the count value is zero. A certain value (for example, one) is added to the count value for every control period, whereby the count value stored inside of the memory is updated.

A comparison result signal is input to the counter 162, and the count value is reset to the initial value in a case where the comparison result signal corresponds to matching. On the other hand, in a case where the comparison result signal corresponds to no-matching, the certain value is continuously added to the count value of the counter 162 for every control period, and a resultant value is output as a count value.

The inversion processor 163 has a comparison result signal and a frequency selection signal being input thereto and inverts the frequency selection signal in a case where the comparison result signal and the frequency selection signal do not match each other.

A series of processes described above forms a continuation determination.

The inverter control unit 114 includes a high-frequency voltage instruction generating unit 131 that outputs an overlapping voltage instruction signal vdch* used for giving an instruction for the frequency of a high-frequency voltage for overlapping based on an overlapping high-frequency signal output from the frequency selecting unit 124. In addition, the inverter control unit 114 includes a rotation phase angle estimating unit 132 that estimates a rotation phase angle of the PMSM 112 based on an input overlapping voltage instruction signal vdch* and a q-axial current detection signal iqc and outputs the estimated phase angle θest.

In addition, the inverter control unit 114 includes: a current control unit 133 that generates fundamental wave voltage instruction signals vdcf* and vqcf* used for current control based on a d-axial current instruction signal idc* and a q-axial current instruction signal iqc* input from the outside such as an operation room or the like and a d-axial current detection signal idc and a q-axial current detection signal iqc calculated based on the detection value of a current detection unit 137 and outputs the fundamental wave voltage instruction signals; and a high-frequency voltage overlapping unit 134 that outputs the d-axial voltage instruction signal vdc* and the q-axial voltage instruction signal vqc* based on the fundamental wave voltage instruction signals vdcf* and vqcf* and the overlapping voltage instruction signal vdch*.

Furthermore, the inverter control unit 114 includes: a first coordinate transformation unit 135 that executes a coordinate transformation of the d-axial voltage instruction signal vdc* and the q-axial voltage instruction signal vqc* that have been input and outputs a U-phase voltage instruction signal vu*, a V-phase voltage instruction signal vv*, and a W-phase voltage instruction signal vw*; and a PWM modulation unit 136 that executes PWM modulation by comparing the input voltage instruction signals vu*, vv*, and vw* with a triangular wave or a saw-tooth wave that is a carrier and outputs a gate signal that is an on/off instruction for each phase switching device of the inverter 111.

In addition, the inverter control unit 114 includes: a current detection unit 137 that detects current response values of a plurality of phases (in the example illustrated in FIG. 17, two phases including a U phase and a W phase) among three-phase AC current flowing through the PMSM 112 and outputs current detection signals (in the example illustrated in FIG. 17, a U-phase current detection signal iu and a W-phase current detection signal iw); and a second coordinate transformation unit 138 that executes a coordinate transformation (UVW/dcqc transformation) of current detection signals (in the example represented in FIG. 17, the U-phase current detection signal iu and the W-phase current detection signal iw) output by the current detection unit 137 and outputs a d-axial current detection signal idc and a q-axial current detection signal iqc.

Next, an operation according to the fourth embodiment will be described.

First, the random number generating unit 121 of the overlapping high-frequency calculating unit 113 generates a random number value and outputs the generated random number value to the continuation period determining unit 122. Here, the random number generating unit 121 calculates a pseudo random number and outputs the pseudo random number as a random number value or outputs a random number value by referring to a random number table.

As a result, the continuation period determining unit 122 determines the continuation period of the overlapping high-frequency based on the input random number value and outputs the determined continuation period as continuation period data. More specifically, the continuation period is calculated using one period of the overlapping high-frequency as the reference by using Equation (5).

continuation period=one period of overlapping high-frequency×random number value (5)

The continuation determining unit 123 executes a continuation determination based on the input continuation period data and outputs a frequency selection signal. In this fourth embodiment, since the frequency of the overlapping high-frequency voltage is one of the maximal overlapping high-frequency f'max and the minimal overlapping high-frequency f'min of two kinds, the frequency selection signal is binary data having one value of "0" and "1". Accordingly, a frequency selection signal corresponding to one of the maximal overlapping high-frequency f'max and the minimal overlapping high-frequency f'min is output to the frequency selecting unit 124 in accordance with the value of the continuation period data The frequency selecting unit 124 outputs one of the maximal overlapping high-frequency f'max and the minimal overlapping high-frequency f'min based on the frequency selection signal to the high-frequency voltage instruction generating unit 131 as an overlapping high-frequency signal.

The high-frequency voltage instruction generating unit 131 of the inverter control unit 114 outputs the overlapping voltage instruction signal vdch* used for giving an instruction for the frequency of the high-frequency voltage for overlapping to the rotation phase angle estimating unit 132 and the high-frequency voltage overlapping unit 134 based on an input overlapping high-frequency signal.

Meanwhile, in order to execute current control, the current control unit 133 generates fundamental wave voltage instruction signals vdcf* and vqcf* based on the d-axial current instruction signal idc*, the q-axial current instruction signal iqc*, the d-axial current detection signal idc, and the q-axial current detection signal iqc that have been input and outputs the generated fundamental wave voltage instruction signals to the high-frequency voltage overlapping unit 134.

As a result, the high-frequency voltage overlapping unit 134 generates a d-axial voltage instruction signal vdc* based on the fundamental wave voltage instruction signal vdcf* and the overlapping voltage instruction signal vdch* and generates a q-axial voltage instruction signal vqc* based on the fundamental wave voltage instruction signal vqcf* and the overlapping voltage instruction signal vdch* and outputs the d-axial voltage instruction signal vdc* and the q-axial voltage instruction signal vqc* that have been generated to the first coordinate transformation unit 135.

The first coordinate transformation unit 135 executes a coordinate transformation of the d-axial voltage instruction signal vdc* and the q-axial voltage instruction signal vqc* that have been input and outputs a U-phase voltage instruction signal vu*, a V-phase voltage instruction signal vv*, and a W-phase voltage instruction signal vw* to the PWM modulation unit 136.

The PWM modulation unit 136 executes PWM modulation by comparing the input voltage instruction signals vu*, vv*, and vw* with a triangular wave or a saw-tooth wave that is a carrier and outputs a gate signal that is an on/off instruction for each phase switching device of the inverter 111 to the inverter 111.

As a result, from the inverter 111 to the PMSM 112, the U-phase current, the V-phase current, and the W-phase current flow in a synchronized state, whereby a rotor, which is not illustrated in the figure, of the PMSM 112 rotates.

In parallel with this, the current detection unit 137 detects current response values of a plurality of phases (in the example illustrated in FIG. 17, two phases including the U phase and the W phase) among three-phase AC currents flowing through the PMSM 112 and outputs current detection signals (in the example illustrated in FIG. 17, the U-phase current detection signal iu and the W-phase current detection signal iw) to the second coordinate transformation unit 138.

The second coordinate transformation unit 138 executes a coordinate transformation (UVW/dcqc transformation) of the current detection signals (in the example illustrated in FIG. 17, the U-phase current detection signal iu and the W-phase current detection signal iw) output by the current detection unit 137, outputs a d-axial current detection signal idc to the current control unit 133, and outputs a q-axial current detection signal iqc to the rotation phase angle estimating unit 132 and the current control unit 133.

As a result, the rotation phase angle estimating unit 132 estimates the rotation phase angle of the PMSM 112 based on the overlapping voltage instruction signal vdch* and the q-axial current detection signal iqc that have been input and outputs an estimated phase angle θest to the first coordinate transformation unit 135 and the second coordinate transformation unit 138.

As a result of the operation described above, the first coordinate transformation unit 135 outputs the voltage instruction signals vu*, vv*, and vw* that are optimal to the rotation state of the PMSM 112 corresponding to the estimated phase angle θest to the PWM modulation unit 136, and accordingly, the inverter 111 executes rotation driving in accordance with the rotation state of the PMSM 112 while suppressing the noise.

Next, a specific operation will be described.

Figure 19:
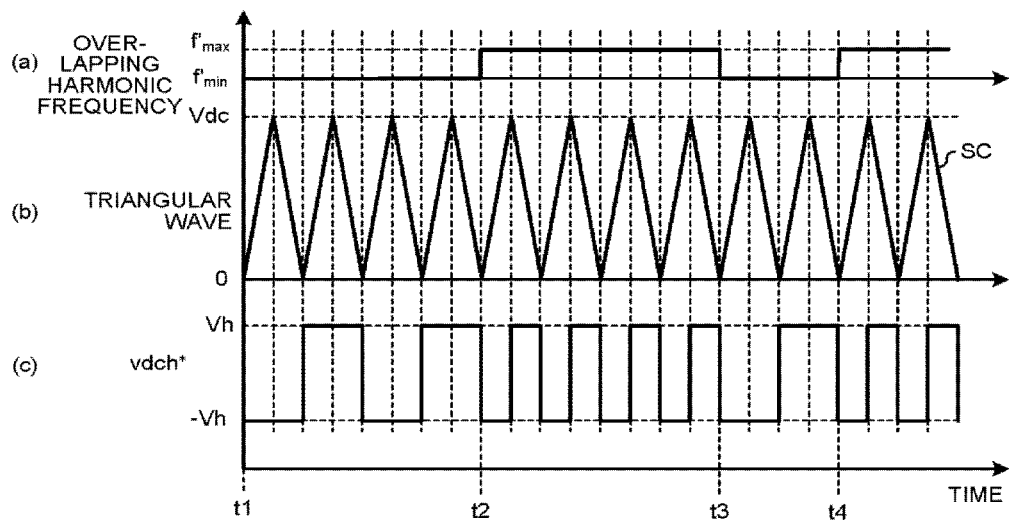
FIG. 19 is a timing diagram in the fourth embodiment.

FIG. 19 is a timing diagram of the fourth embodiment.

As illustrated in FIG. 19, when the DC power supply voltage of the PWM modulation unit 136 is Vdc [V], the carrier signal SC that is generated by the carrier signal generating unit is a triangular wave transiting between two voltage levels of zero [V] and the DC power supply voltage Vdc [V].

In addition, the overlapping voltage instruction signal vdch* output by the high-frequency voltage instruction generating unit 131, as illustrated in FIG. 19, is a rectangular wave of which the period has a frequency corresponding to the overlapping high-frequency (the maximal overlapping high-frequency f'max or the minimal overlapping high-frequency f'min).

More specifically, in FIG. 19, in a period from time t1 to time t2 and a period from time t3 to time t4, since the overlapping high-frequency=the minimal overlapping high-frequency f'min, the overlapping voltage instruction signal vdch* is a rectangular wave having a relatively low frequency.

On the other hand, in FIG. 19, in a period from time t2 to time t3 and a period after time t4, since the overlapping high-frequency=the maximal overlapping high-frequency f'max, the overlapping voltage instruction signal vdch* is a rectangular wave having a relatively high frequency.

Figure 20:
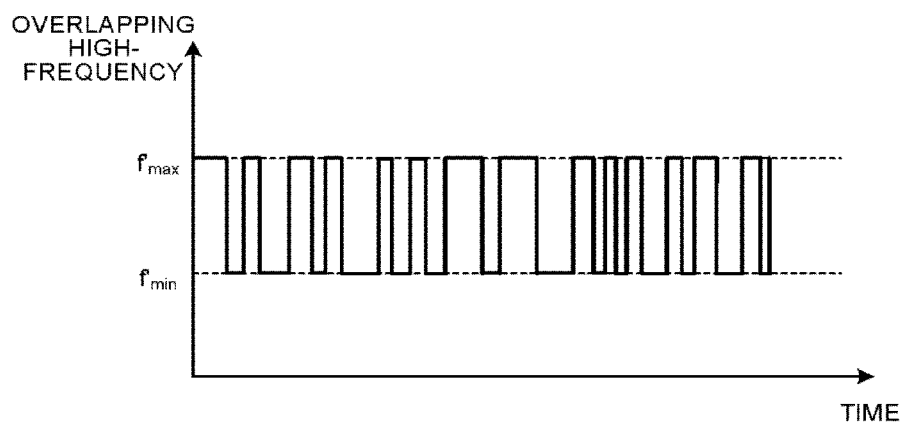
FIG. 20 is an explanatory diagram of a switching state of an overlapping high-frequency.

FIG. 20 is an explanatory diagram of a switching state of the overlapping high-frequency.

Here, FIG. 20 is a diagram acquired by representing FIG. 19(a) in the time axis of a long period.

As illustrated in FIG. 20, according to this fourth embodiment, based on a random number value generated by the random number generating unit 121, the overlapping high-frequency is configured such that a continuation period of the maximal overlapping high-frequency f'max or the minimal overlapping high-frequency f'min is randomly changed.

Thus, according to this fourth embodiment, since the continuation period in which the overlapping high-frequency of the same frequency is applied is different for each time, the component of the average frequency in the overlapping high-frequency selection range can be decreased.

In addition, according to this fourth embodiment, by changing the continuation period in accordance with a random number value, there is no regularity of a change of the continuation period of the overlapping high-frequency of the same frequency, and accordingly, there is no occurrence of audible sense of incongruity accompanied with the change of the continuation period.

According to this fourth embodiment, since the continuation period of the overlapping high-frequency is different for each time, the component of the average frequency of the overlapping high-frequency selection range can be decreased.

In addition, according to this fourth embodiment, the continuation period is changed in accordance with a random number value, and accordingly, there is no regularity of a change of the continuation period in which the same overlapping high-frequency is maintained and continued, whereby an occurrence of audible sense of incongruity accompanied with the change of the continuation period can be suppressed.

Regarding the selection range of the carrier frequency, the upper limit frequency f'max is limited by the control calculation processing time of a microcomputer, and the lower limit frequency f'min is limited by the degradation of the controllability according to a control delay. Accordingly, a wide frequency band from the upper limit frequency f'max to the lower limit frequency f'min cannot be taken.

Figure 21:
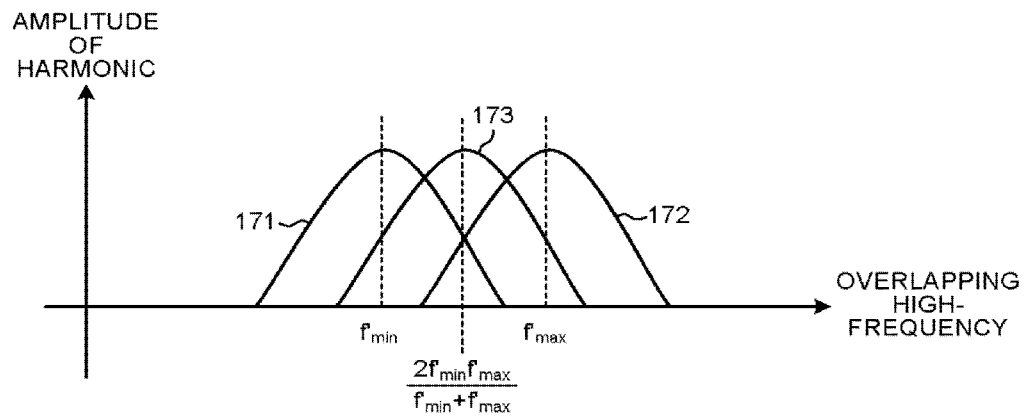
FIG. 21 is an explanatory diagram of a relation between an overlapping high-frequency and a harmonic component.

FIG. 21 is an explanatory diagram of a relation between the overlapping high-frequency and a harmonic component.

In other words, as illustrated in FIG. 21, a peak 171 of a harmonic component according to the minimal overlapping high-frequency f'min that is the lower limit frequency, and a peak 172 of a harmonic component according to the maximal overlapping high-frequency f'max that is the upper limit frequency, and a peak 173 of a harmonic component accompanied with a transition of the frequency overlap each other. Thus, in the overlapping high-frequency selection range, in order to expand the range of the dispersion as much as possible, it is more preferable to select two frequencies that are the minimal overlapping high-frequency f'min that is a frequency of the lower limit of the overlapping high-frequency selection range and the maximal overlapping high-frequency f'max that is a frequency of the upper limit thereof as the overlapping high-frequency and change the continuation period for the dispersion.

In addition, it is preferable that the continuation period is an integer number of times of the half period of the carrier period in a case where the carrier is a triangular wave and is an integer number of times of one period of the carrier in a case where the carrier is a saw-tooth wave such that, as possibly as can be, the update timing of the overlapping high-frequency is a peak portion or a valley portion of the carrier wave. In such a case, the premise of the PWM that an average of the output voltage between the peak portion and the valley portion of the carrier wave is the voltage value of an output voltage instruction is maintained, and an occurrence of an error in the output voltage according to a change in the carrier frequency can be prevented.

[5.1] Modified Example of Fourth Embodiment

[5.1.1] First Modified Example

In the configuration described above, it may be configured such that the continuation period in which the overlapping high-frequency is maintained is integer times of a half of the period of the overlapping high-frequency, and the frequency of the overlapping high-frequency is changed at timing when the high-frequency current becomes zero.

In such a case, a more stable transformation can be realized.

In addition, by configuring the continuation period to be integer times of one period of the overlapping high-frequency, the rotation phase angle can be estimated through the calculation of the Fourier series of one period of the high frequency, in other words, the estimated phase angle θest can be accurately calculated.

[5.1.2] Second Modified Example

In the fourth embodiment described above, while a method of overlapping the high-frequency voltage has been illustrated, the same effect can be acquired by using a method of overlapping a high-frequency current.

In addition, in the fourth embodiment described above, while an example has been illustrated in which a rectangular wave overlaps the overlapping high-frequency voltage at the d axis, the same effect can be acquired also in the case of overlapping the voltage at both the d axis and the q axis or at only the q axis or overlapping a sinusoidal wave.

[5.1.3] Third Modified Example

Figure 22:
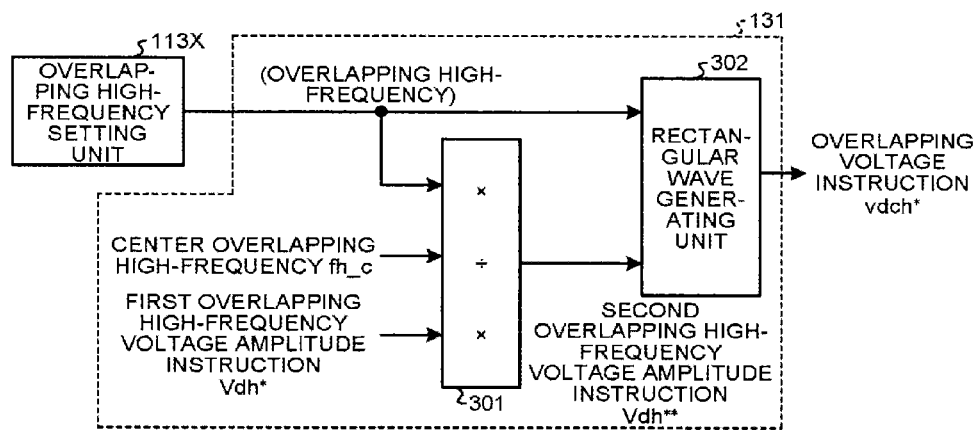
FIG. 22 is an outline configuration block diagram of a high-frequency voltage instruction generating unit.

FIG. 22 is an outline configuration block diagram of the high-frequency voltage instruction generating unit.

The high-frequency voltage instruction generating unit 131 includes: an overlapping high-frequency voltage amplitude instruction generating unit 301 that outputs a value acquired by dividing the overlapping high-frequency (f'max or f'min) input from an overlapping high-frequency setting unit 13X by a center overlapping high-frequency fh_c represented in Equation (6) or Equation (7) and multiplying a resultant value by a first overlapping high-frequency voltage amplitude instruction value Vdh* as a second overlapping high-frequency voltage amplitude instruction value Vdh**; and a rectangular wave generating unit 302 that generates an overlapping voltage instruction signal vdch* by setting the overlapping high-frequency voltage amplitude of the input overlapping high-frequency (f'max or f'min) to a value corresponding to the second overlapping high-frequency voltage amplitude instruction value Vdh**.

$$f_{h\_c} = \frac{2 f'_{max} f'_{min}}{f'_{min} + f'_{max}} \quad (6)$$

$$f_{h\_c} = \frac{f'_{max} + f'_{min}}{2} \quad (7)$$

Figure 23:
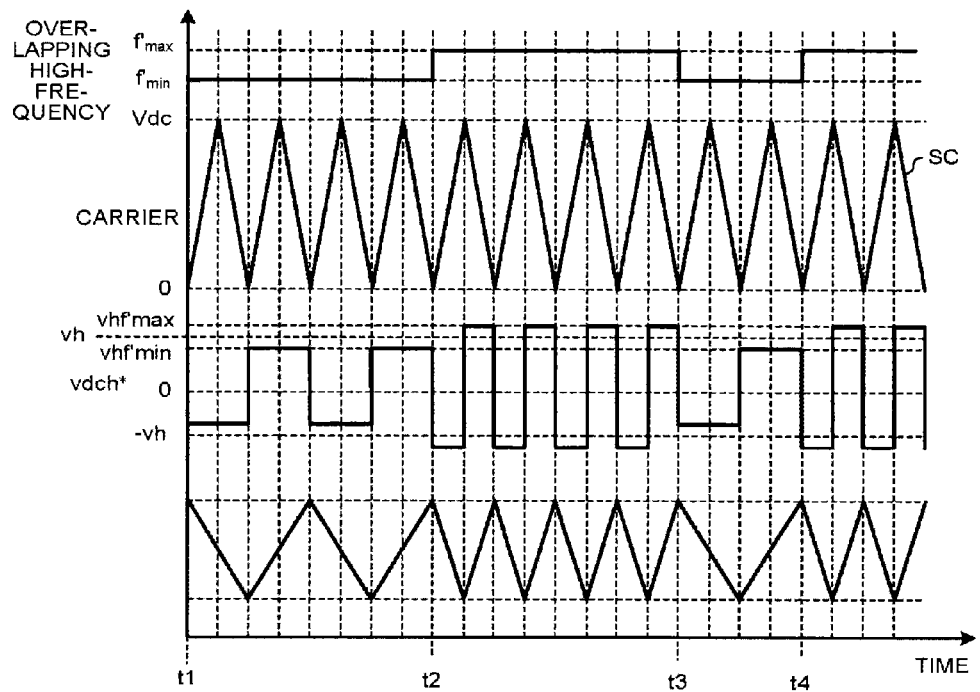
FIG. 23 is an explanatory timing diagram of the operation in a modified example.

FIG. 23 is an explanatory timing diagram of the operation in the third modified example.

As a result of the configuration described above, as illustrated in FIG. 23, in a period from time t1 to time t2 and a period from time t3 to time t4, the overlapping high-frequency=f'min (<f'max). In a case where the overlapping high-frequency is the amplitude of the overlapping voltage instruction signal vdch* at the center overlapping high-frequency $f_{h\_c}$=vh [V], the value of the overlapping voltage instruction signal vdch* in this period is the amplitude vhf'min (<vh) of the overlapping voltage instruction signal vdch* at the overlapping high-frequency=f'min.

In addition, as illustrated in FIG. 23, in a period from time t2 to time t3 and a period after time t4, the overlapping high-frequency=f'max, and, in a case where the overlapping high-frequency is the amplitude of the overlapping voltage instruction signal vdch* at the center overlapping high-frequency $f_{h\_c}$=vh [V], the value of the overlapping voltage instruction signal vdch* in this period is the amplitude vhf'max (>vh) of the overlapping voltage instruction signal vdch* at the overlapping high-frequency=f'max.

The amplitude Ih of the high-frequency current idch can be approximated as in the following equation by using the amplitude vh of the overlapping voltage instruction signal vdch*, the overlapping high-frequency fh, and the inductance L.

$$Ih \approx vh/(4 \cdot fh \times L)$$

Accordingly, as a result of the configuration described above, vh/fh is constant, and thus, as illustrated in FIG. 23, the amplitude of the high-frequency current idch generated by the overlapping high-frequency voltage is constant regardless of the value (f'min or f'max) of the overlapping high-frequency, whereby the SN ratio can be maintained to be constant.

By configuring as such, also in a case where the estimation accuracy for the rotor magnetic pole position decreases as the overlapping high-frequency is configured to be changeable so as to reduce the noise, control can be executed in accordance with the voltage amplitude of the overlapping high-frequency, and accordingly, estimation accuracy that is similar to a case where the overlapping high-frequency is constant can be maintained.

Figure 24:
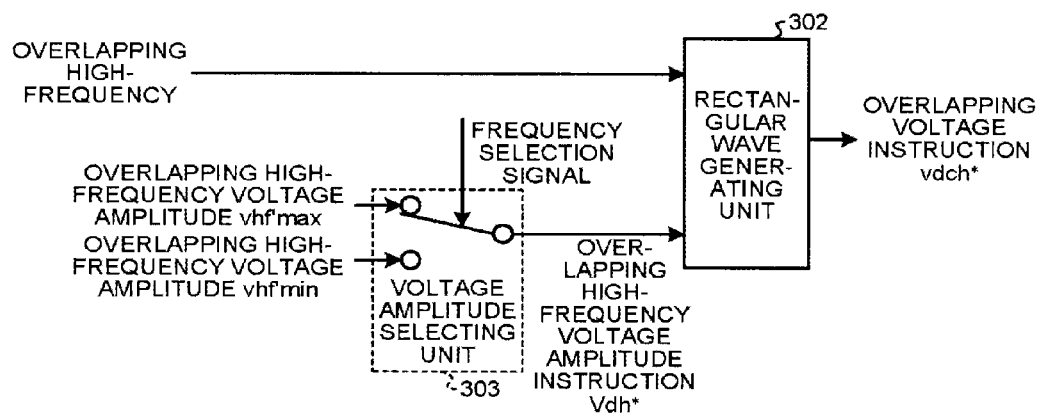
FIG. 24 is an outline configuration block diagram of another high-frequency voltage instruction generating unit.

FIG. 24 is an outline configuration block diagram of another high-frequency voltage instruction generating unit.

In the configuration illustrated in FIG. 24, a frequency selection signal is transmitted from the continuation determining unit 123 illustrated in FIG. 17 to the high-frequency voltage instruction generating unit 131.

The high-frequency voltage instruction generating unit 131 includes: a voltage amplitude selecting unit 303 that outputs one of the overlapping high-frequency voltage amplitude vhf max corresponding to the maximal overlapping high-frequency fmax and the overlapping high-frequency voltage amplitude vhf min corresponding to the minimal overlapping high-frequency f'min based on the frequency selection signal input from the continuation determining unit 123; and a rectangular wave generating unit 302 that sets the overlapping voltage instruction signal vdch* based on the input overlapping high-frequency (f'max or f'min) and the input overlapping high-frequency voltage amplitude (vhf'max or vhf'min).

According to this configuration, the amplitude of the high-frequency current idch generated by the overlapping high-frequency voltage is constant regardless of the value of the overlapping high-frequency voltage frequency, and accordingly, the SN ratio can be maintained to be constant.

By combining the high-frequency voltage instruction generating unit 131 illustrated in FIG. 24 with the overlapping high-frequency calculating unit 113 according to the fourth embodiment, as illustrated in FIG. 24, the overlapping high-frequency voltage amplitude instruction Vdh* can be selected only by a switching operation executed by a switch like the voltage amplitude selecting unit 303 by using the frequency selection signal generated by the overlapping high-frequency calculating unit 113, whereby the program can be simplified.

[6] Fifth Embodiment

Figure 25:
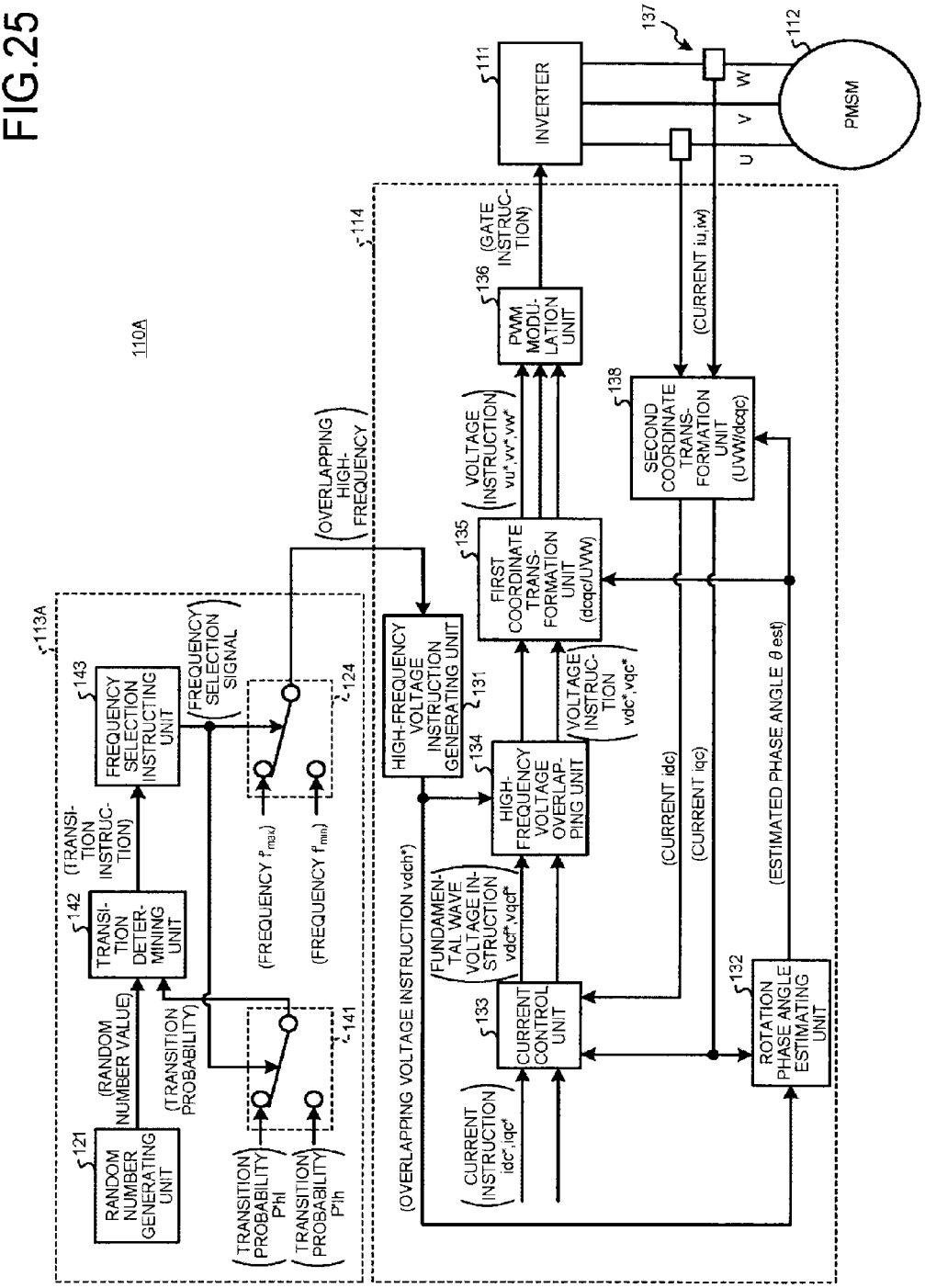
FIG. 25 is an outline configuration block diagram of a PMSM rotation sensorless control system according to a fifth embodiment.

FIG. 25 is an outline configuration block diagram of a PMSM rotation sensorless control system according to a fifth embodiment.

In FIG. 25, the same reference numeral is attached to each same portion as that of the fourth embodiment illustrated in FIG. 17.

In the fifth embodiment, a difference from the fourth embodiment is that, while the continuation period of the same overlapping high-frequency that is continuously used is set simply based on the random number value in the fourth embodiment, an overlapping high-frequency calculating unit that determines whether or not a random number value satisfies a condition for a transition based on a transition probability value by using the random number value and the transition probability value is included in the fifth embodiment. In this case, by using a plurality of transition probability values, it is determined whether or not a transition is made from a certain overlapping high-frequency to a different overlapping high-frequency. Accordingly, by controlling generated high-frequency components, the overlapping high-frequency can be switched to be further more uniformly, whereby the acquired harmonic components can be uniformly dispersed.

A overlapping high-frequency calculating unit 113A of a PMSM rotation sensorless control system 110A, when being largely divided, as illustrated in FIG. 25, includes: a random number generating unit 121 that generates a random number; a transition probability selecting unit 141 that selects and outputs one of a plurality of transition probability values set in advance based on the frequency selection signal; a transition determining unit 142 that executes a determination of whether or not a frequency transition is made based on the input random number value and the input transition probability value and outputs a transition instruction signal; a frequency selection instructing unit 143 that outputs a frequency selection signal based on the input transition instruction signal; and a frequency selecting unit 124 that exclusively outputs one of a maximal overlapping high-frequency f'max and a minimal overlapping high-frequency f'min based on the frequency selection signal as an overlapping high-frequency signal.

In this fifth embodiment, since used overlapping high-frequencies are the maximal overlapping high-frequency f'max and the minimal overlapping high-frequency f'min of two kinds, two transition probability values are used which include a transition probability value P'hl that is a probability value for a transition of the overlapping high-frequency from the maximal overlapping high-frequency f'max to the minimal overlapping high-frequency f'min and a transition probability value P'lh that is a probability value for a transition of the overlapping high-frequency from the minimal overlapping high-frequency f'min to the maximal overlapping high-frequency f'max.

Next, the operation according to the fifth embodiment will be described.

First, the random number generating unit 121 of the overlapping high-frequency calculating unit 113A generates a random number value and outputs the generated random number value to the transition determining unit 142. Here, the random number generating unit 121, similarly to the first embodiment, calculates a pseudo random number and outputs the pseudo random number as a random number value or outputs a random number value to the transition determining unit 142 by referring to a random number table.

In parallel with this, the transition probability selecting unit 141 selects one of a plurality of the transition probability values P'hl and P'lh set in advance based on the frequency selection signal output by the frequency selection instructing unit 143 and outputs the selected transition probability value to the transition determining unit 142.

More specifically, in a case where a frequency selection signal corresponding to the maximal overlapping high-frequency f'max is input to the transition probability selecting unit 141 from the frequency selection instructing unit 143, the transition probability value P'hl that is a probability value for a transition of the overlapping high-frequency from the maximal overlapping high-frequency f'max to the minimal overlapping high-frequency f'min is output to the transition determining unit 142.

On the other hand, in a case where a frequency selection signal corresponding to the minimal overlapping high-frequency f'min is input to the transition probability selecting unit 141 from the frequency selection instructing unit 143, the transition probability value P'lh that is a probability value for a transition of the overlapping high-frequency from the minimal overlapping high-frequency f'min to the maximal overlapping high-frequency f'max is output to the transition determining unit 142.

As a result, the transition determining unit 142 executes a transition determination of whether or not a frequency transition is made based on the random number value and the transition probability value that have been input. Thereafter, the transition determining unit 142 outputs a transition instruction signal corresponding to a result of the executed transition determination to the frequency selection instructing unit 143.

More specifically, for example, in a case where the input random number value that is input with the random number value being set to be in the range of "0" to "1" is a transition probability (for example, a transition probability value P'hl=0.45) or less, a transition instruction signal for a transition to an overlapping high-frequency other than the current overlapping high-frequency is output to the frequency selection instructing unit 143.

The frequency selection instructing unit 143 outputs a frequency selection signal to the frequency selecting unit 124 based on the input transition instruction signal.

As a result, the frequency selecting unit 124 outputs one of the maximal overlapping high-frequency f'max and the minimal overlapping high-frequency f'min to the high-frequency voltage instruction generating unit 131 based on the input frequency selection signal as an overlapping high-frequency signal. The high-frequency voltage instruction generating unit 131 generates an overlapping voltage instruction signal vdch* corresponding to a frequency (in this second embodiment, one of the maximal overlapping high-frequency f'max and the minimal overlapping high-frequency f'min) corresponding to the overlapping high-frequency signal. In addition, the high-frequency voltage instruction generating unit 131 outputs the generated overlapping voltage instruction signal vdch* to the rotation phase angle estimating unit 132 and the high-frequency voltage overlapping unit 134.

Meanwhile, in order to execute current control, the current control unit 133 generates fundamental wave voltage instruction signals vdcf* and vqcf* based on the d-axial current instruction signal idc*, the q-axial current instruction signal iqc*, the d-axial current detection signal idc, and the q-axial current detection signal iqc that have been input and outputs the generated fundamental wave voltage instruction signals to the high-frequency voltage overlapping unit 134.

As a result, the high-frequency voltage overlapping unit 134 generates a d-axial voltage instruction signal vdc* based on the fundamental wave voltage instruction signal vdcf* and the overlapping voltage instruction signal vdch* and generates a q-axial voltage instruction signal vqc* based on the fundamental wave voltage instruction signal vqcf* and the overlapping voltage instruction signal vqch*. Then, the high-frequency voltage overlapping unit 134 outputs the d-axial voltage instruction signal vdc* and the q-axial voltage instruction signal vqc* that have been generated to the first coordinate transformation unit 135.

The first coordinate transformation unit 135 executes a coordinate transformation of the d-axial voltage instruction signal vdc* and the q-axial voltage instruction signal vqc* that have been input and generates a U-phase voltage instruction signal vu*, a V-phase voltage instruction signal vv*, and a W-phase voltage instruction signal vw*. Then, the first coordinate transformation unit 135 outputs the U-phase voltage instruction signal vu*, the V-phase voltage instruction signal vv*, and the W-phase voltage instruction signal vw* that have been generated to the PWM modulation unit 136.

The PWM modulation unit 136 executes PWM modulation by comparing the input voltage instruction signals vu*, vv*, and vw* with a triangular wave or a saw-tooth wave that is a carrier and outputs a gate signal that is an on/off instruction for each phase switching device of the inverter 111 to the PMSM 112.

As a result, through the PMSM 112, the U-phase current, the V-phase current, and the W-phase current flow in a synchronized state, whereby a rotor, which is not illustrated in the figure, of the PMSM 112 rotates.

In parallel with this, the current detection unit 137 detects current response values of a plurality of phases (in the example illustrated in FIG. 25, two phases including the U phase and the W phase) among three-phase AC currents flowing through the PMSM 112 and outputs current detection signals (in the example illustrated in FIG. 25, the U-phase current detection signal iu and the W-phase current detection signal iw) to the second coordinate transformation unit 138.

The second coordinate transformation unit 138 executes a coordinate transformation (UVW/dcqc transformation) of the current detection signals (in the example illustrated in FIG. 25, the U-phase current detection signal iu and the W-phase current detection signal iw) output by the current detection unit 137, outputs a d-axial current detection signal idc to the current control unit 133, and outputs a q-axial current detection signal iqc to the rotation phase angle estimating unit 132 and the current control unit 133.

As a result, the rotation phase angle estimating unit 132 estimates the rotation phase angle of the PMSM 112 based on the overlapping voltage instruction signal vdch* and the q-axial current detection signal iqc that have been input and outputs an estimated phase angle θest to the first coordinate transformation unit 135 and the second coordinate transformation unit 138.

As a result of the operation described above, the first coordinate transformation unit 135 outputs the voltage instruction signals vu*, vv*, and vw* that are optimal to the rotation state of the PMSM 112 corresponding to the estimated phase angle θest to the PWM modulation unit 136, and accordingly, the inverter 111 executes rotation driving in accordance with the rotation state of the PMSM 112 while suppressing the noise.

In addition, in this fifth embodiment, in addition to the effects of the fourth embodiment, by using an appropriate transition probability value, the transition state of the overlapping high-frequency can be adjusted, and accordingly, a desired frequency spectrum distribution of harmonics can be easily generated.

Here, the adjustment of the frequency spectrum distribution of harmonics according to the transition probability value will be described.

In this fifth embodiment, there are only four operation modes as below.
(1) Continuation of Minimal Overlapping high-frequency f'min
(2) Continuation of Maximal Overlapping high-frequency f'max
(3) Transition from Minimal Overlapping high-frequency f'min to Maximal Overlapping high-frequency f'max
(4) Transition from Maximal Overlapping high-frequency f'max to Minimal Overlapping high-frequency f'min FIG. 26 is an explanatory diagram of the operation according to the fifth embodiment.

Figure 26:
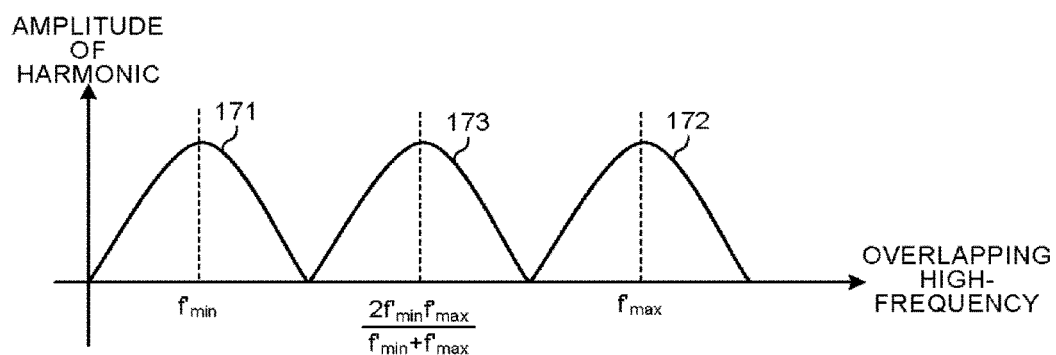
FIG. 26 is an explanatory diagram of the operation in the fifth embodiment.

In this case, as frequency spectrum distributions of generated harmonics, as illustrated in FIG. 26, there are three kinds of frequency spectrum distributions.

In other words, (1) a frequency spectrum distribution 171 at the time of continuation of the minimal overlapping high-frequency f'min, (2) a frequency spectrum distribution 172 at the time of continuation of the maximal overlapping high-frequency f'max, and (3) a frequency spectrum distribution 173 both at the time of a transition from the minimal overlapping high-frequency f'min to the maximal overlapping high-frequency f'max and at the time of a transition from the maximal overlapping high-frequency f'max to the minimal overlapping high-frequency f'min, which will be commonly described.

Thus, these three kinds of frequency spectrum distributions will be used for the description.

The amplitudes of harmonic components at the peaks of the frequency spectrum distributions can be represented in Equations (8) to (10).

$$\text{Amplitude of Harmonic of } f'_{min} \text{ Component} = \quad (8)$$
$$\frac{f'_{max}}{f'_{min}} \frac{P'_{h1}(1-P'_{1h})}{f'_{min}P'_{1h}+f'_{max}P'_{h1}} C$$

$$\text{Amplitude of Harmonic of } f'_{max} \text{ Component} = \quad (9)$$
$$\frac{f'_{min}}{f'_{max}} \frac{P'_{1h}(1-P'_{h1})}{f'_{min}P'_{1h}+f'_{max}P'_{h1}} C$$

$$\text{Amplitude of Harmonic of } \frac{2f'_{min}f'_{max}}{f'_{min}+f'_{max}} \text{ Component} = \quad (10)$$
$$\frac{(f'_{min}+f'_{max})^2}{2f'_{min}f'_{max}} \frac{P'_{h1}P'_{1h}}{f'_{min}P'_{1h}+f'_{max}P'_{h1}} C$$

Here, while a constant C changes according to a modulation rate, a dispersion range, and the like, the constant C is common to three dispersions.

Based on the description presented above, in this fifth embodiment, the frequency spectrum distributions of harmonics are adjusted.

For example, in a case where the harmonic component of the minimal overlapping high-frequency f'min is desired to be increased, the transition probability value P'hl for a transition of the overlapping high-frequency from the maximal overlapping high-frequency f'max to the minimal overlapping high-frequency f'min may be increased, or the transition probability value P'lh for a transition of the overlapping high-frequency from the minimal overlapping high-frequency f'min to the maximal overlapping high-frequency f'max may be decreased.

In addition, in a case where the harmonic component of the maximal overlapping high-frequency f'max is desired to be increased, the transition probability value P'hl for a transition of the overlapping high-frequency from the maximal overlapping high-frequency f'max to the minimal overlapping high-frequency f'min may be decreased, or the transition probability value P'lh for a transition of the overlapping high-frequency from the minimal overlapping high-frequency f'min to the maximal overlapping high-frequency f'max may be increased.

Furthermore, in a case where a harmonic component generated according to a transition from the minimal overlapping high-frequency f'min to the maximal overlapping high-frequency f'max or a transition from the maximal overlapping high-frequency f'max to the minimal overlapping high-frequency f'min is desired to be increased, the transition probability value P'hl for a transition of the overlapping high-frequency from the maximal overlapping high-frequency f'max to the minimal overlapping high-frequency f'min or the transition probability value P'lh for a transition of the overlapping high-frequency from the minimal overlapping high-frequency f'min to the maximal overlapping high-frequency f'max may be increased. In this way, any kind of frequency spectrum distribution can be generated.

However, as also described in the fourth embodiment, generally, a wide selection range of the overlapping high-frequency cannot be taken.

In other words, as illustrated in FIG. 21, the frequency spectrum distribution 171 of a harmonic component according to the minimal overlapping high-frequency f'min that is the lower limit, the frequency spectrum distribution 172 of a harmonic component according to the maximal overlapping high-frequency f'max, and the frequency spectrum distribution 173 of a harmonic component resulted from a transition of the overlapping high-frequency overlap each other.

Figure 27:
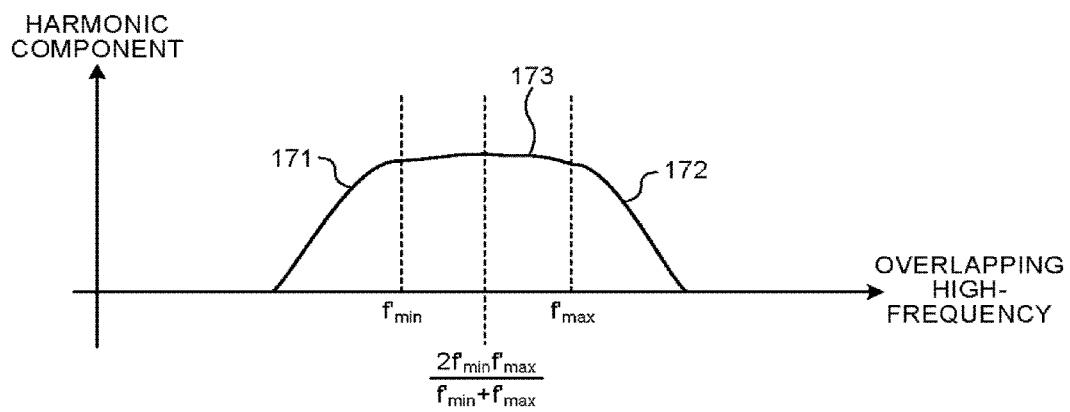
FIG. 27 is an explanatory diagram of effects in the fifth embodiment.

FIG. 27 is an explanatory diagram of effects in the fifth embodiment.

In FIG. 27, when the frequency spectrum distribution 173 resulted from a transition of the overlapping high-frequency overlaps the frequency spectrum distribution 171 of the harmonic component according to the minimal overlapping high-frequency f'min and the frequency spectrum distribution 172 of the harmonic component according to the maximal overlapping high-frequency f'max, a sum of the spectrums becomes flat. In order to form the sum of the spectrums to be flat, by setting the transition probability values P'hl and P'lh such that the frequency spectrum distribution 173 is lower than the frequency spectrum distribution 171 and the frequency spectrum distribution 172, as illustrated in FIG. 27, the sum of the spectrums can be formed to be flat within the selection range of the overlapping high-frequency as possibly as can be.

Also in this fifth embodiment, similarly to the fourth embodiment, the component of the average frequency of the overlapping high-frequency selection range can be decreased, for example, by executing a transition determination based on not a random number but a sinusoidal wave.

In addition, the change of the overlapping high-frequency may be made only at a peak position or a bottom position such that the update timing of the overlapping high-frequency is at the peak of the frequency spectrum distribution of the carrier or the bottom of the frequency spectrum distribution. In such a case, the premise of the PWM that an average of the output voltage between the peak and the bottom of the carrier wave is an output voltage instruction is maintained, and an occurrence of an error in the output voltage according to a change in the overlapping high-frequency can be prevented.

[7] Sixth Embodiment

Figure 28:
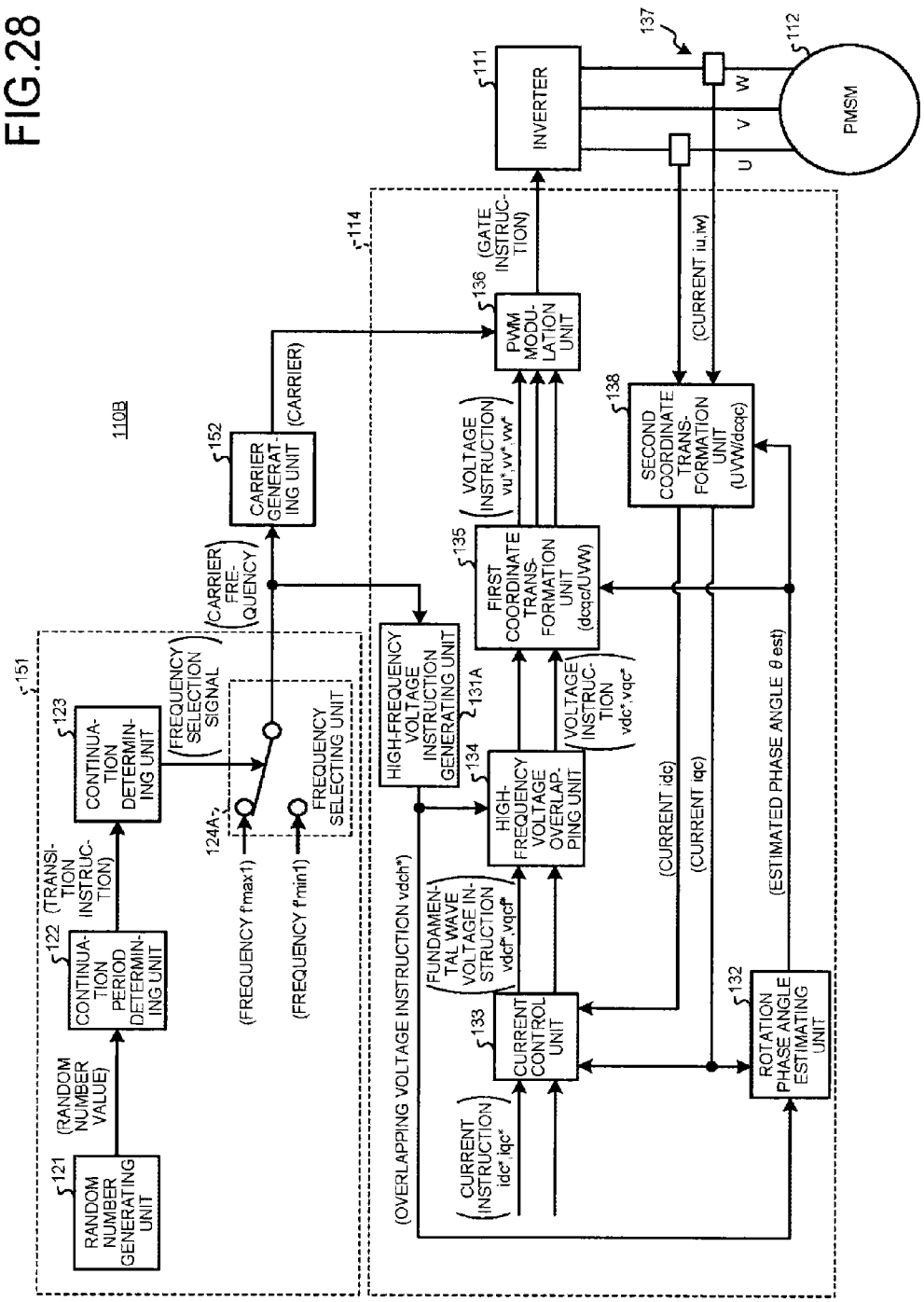
FIG. 28 is an outline configuration block diagram of a PMSM rotation sensorless control system according to a sixth embodiment.

FIG. 28 is an outline configuration block diagram of a PMSM rotation sensorless control system according to a sixth embodiment.

In FIG. 28, the same reference numeral is attached to each same portion as that of the fourth embodiment illustrated in FIG. 17.

In this sixth embodiment, there is a difference from the fourth embodiment that, instead of the overlapping high-frequency calculating unit 113, in a PMSM rotation sensorless control system 110B, a carrier frequency calculating unit 151 that determines the carrier frequency (in the case illustrated in FIG. 28, one of the maximal carrier frequency f'max1 and the minimal carrier frequency f'min1) used by the PWM modulation unit 136 is used, a carrier generating unit 152 that generates a carrier signal SC having the carrier frequency determined by the carrier frequency calculating unit 151 and outputs the generated carrier to the PWM modulation unit 136 is provided, and a high-frequency voltage instruction generating unit 131A that outputs an overlapping voltage instruction signal vdch* used for giving an instruction for the frequency of the high-frequency voltage for overlapping based on the carrier frequency signal is provided.

Next, an operation according to the sixth embodiment will be described.

First, the random number generating unit 121 of the carrier frequency calculating unit 151 generates a random number value and outputs the generated random number value to the continuation period determining unit 122. Here, the random number generating unit 121 calculates a pseudo random number and outputs the pseudo random number as a random number value or outputs a random number value by referring to a random number table.

As a result, the continuation period determining unit 122 determines the continuation period of the overlapping high-frequency based on the input random number and outputs the determined continuation period as continuation period data. More specifically, the continuation period is calculated using one period of the overlapping high-frequency as the reference by using Equation (1) described above in the first embodiment.

The continuation determining unit 123 executes a continuation determination based on the input continuation period data and outputs a frequency selection signal. In the sixth embodiment, since the carrier frequency is one of the maximal carrier frequency f'max1 and the minimal carrier frequency f'min1 of two kinds, the frequency selection signal is binary data having one value of "0" and "1". Accordingly, a frequency selection signal corresponding to one of the maximal carrier frequency f'max1 and the minimal carrier frequency f'min1 is output to the frequency selecting unit 124 in accordance with the continuation determination.

The frequency selecting unit 124 outputs one of the maximal carrier frequency f'max1 and the minimal carrier frequency f'min1 as the carrier frequency signal to the high-frequency voltage instruction generating unit 131A and the carrier generating unit 152 based on the frequency selection signal.

As a result, the high-frequency voltage instruction generating unit 131A outputs an overlapping voltage instruction signal vdch* used for giving an instruction for the frequency of the high-frequency voltage for overlapping to the rotation phase angle estimating unit 132 and the high-frequency voltage overlapping unit 134 based on the input carrier frequency signal.

Meanwhile, the carrier generating unit 152 generates a carrier signal SC of a frequency (in the sixth embodiment, one of the maximal carrier frequency f'max1 and the minimal carrier frequency f'min1) corresponding to the carrier frequency signal and outputs the generated carrier signal SC to the PWM modulation unit 136.

Figure 29:
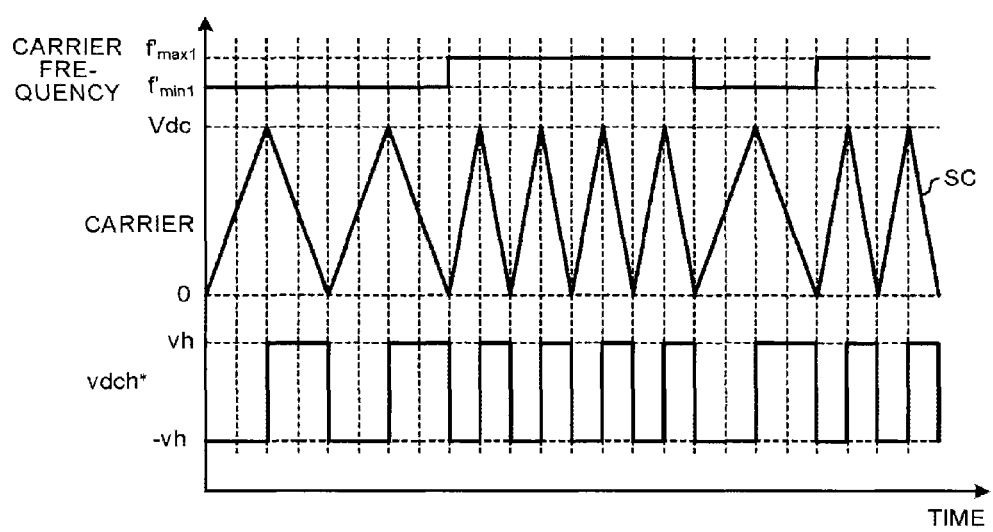
FIG. 29 is a timing diagram in the sixth embodiment.

FIG. 29 is a timing diagram in the sixth embodiment.

According to the configuration described above, the carrier frequency calculating unit 151 according to the sixth embodiment generates a carrier frequency in which the continuation period of the maximal carrier frequency f'max1 or the minimal carrier frequency f'min1 is randomly changed. The carrier frequency is output from the carrier frequency calculating unit 151 to the carrier generating unit 152. The carrier generating unit 152 outputs the carrier signal SC to the PWM modulation unit 136 by using the input carrier frequency.

According to this sixth embodiment, by synchronizing the overlapping high-frequency with the carrier, both an electromagnetic noise according to a frequency of the overlapping high-frequency and an electromagnetic noise according to the overlapping high-frequency can be reduced at the same time.

In the description presented above, while the frequency of the overlapping high-frequency voltage is configured to be the same as the carrier frequency, for example, the carrier frequency may be a half, one third, or the like of the overlapping high-frequency as long as the frequencies are synchronized with each other.

Figure 30:
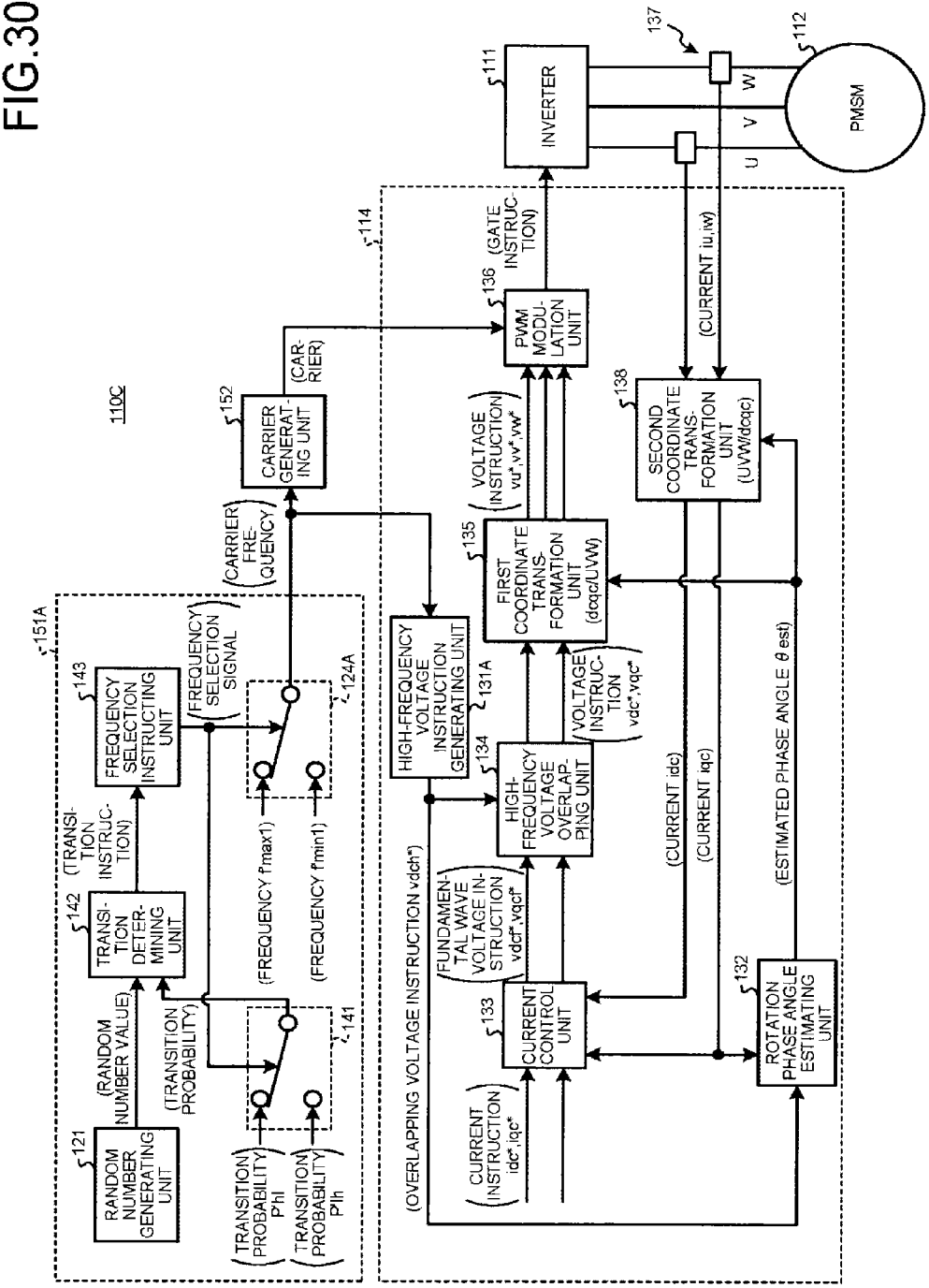
FIG. 30 is an explanatory diagram of a modified example in the sixth embodiment.

FIG. 30 is an explanatory diagram of a modified example of the sixth embodiment.

In this sixth embodiment, while the carrier frequency calculating unit 151 uses the same calculation method as that of the overlapping high-frequency calculating unit 113 according to the fourth embodiment, in the modified example of this sixth embodiment, in a PMSM rotation sensorless control system 110C, as illustrated in FIG. 30, the configuration of a carrier frequency calculating unit 151A using the same calculation method as that of the overlapping high-frequency calculating unit 113A according to the fifth embodiment may be employed.

Also in this sixth embodiment, similarly to the fourth and fifth embodiments, the component of the average frequency in the overlapping high-frequency selection range can be decreased, for example, by executing a transition determination based on not a random number value but a sinusoidal wave.

In addition, also in this sixth embodiment, similarly to the fourth and fifth embodiments, the same effect can be acquired by using a method of overlapping a high-frequency current. In addition, the same effect can be acquired also in the case of overlapping the voltage at both the d axis and the q axis or at only the q axis or overlapping a sinusoidal wave.

[8] Modified Example of Fourth to Sixth Embodiments

[8.1] First Modified Example

The rotation sensorless control device according to the fourth to sixth embodiments includes a control device such as a CPU, a storage device such as a read only memory (ROM) or a RAM, an external storage device such as an HDD or a CD drive device, a display device such as a display apparatus, and an input device such as a keyboard or a mouse and can be configured by employing a hardware configuration using a general computer.

[8.2] Second Modified Example

The control program executed by the rotation sensorless control device according to the fourth to sixth embodiments may be provided in an installable form or an executable form with being recorded on a computer-readable recording medium such as a CD-ROM, a flexible disk (FD), a CD-R, or a digital versatile disk (DVD).

[8.3] Third Modified Example

In addition, the control program executed by the rotation sensorless control device according to the fourth to sixth embodiments may be configured to be provided by being stored on a computer connected to a network such as the Internet and downloaded through the network. Furthermore, the control program executed by the control unit of the rotation sensorless control device according to the fourth to sixth embodiments may be configured to be provided or distributed through a network such as the Internet.

[8.4] Fourth Modified Example

The control program executed by the rotation sensorless control device according to the fourth to sixth embodiments may be configured to be built in a ROM or the like in advance and is provided.

As above, while several embodiments of the present invention have been described, such embodiments are presented as examples and are not for the purpose of limiting the scope of the invention. Such novel embodiments may be executed in other various forms, and various omissions, substitution, and changes can be made therein in a range not departing from the concept of the invention. These embodiments and modifications thereof belong to the scope and the concept of the invention and are included in the invention described in claims and an equivalent range thereof.

APPENDIX

Configuration 1

A power conversion device control method executed by a power conversion device including a power conversion unit that executes a power conversion based on a PWM signal and supplies converted power to a load, the power conversion device control method comprising: generating a carrier of a particular set carrier frequency during a certain continuation time; setting the continuation time to be random and setting one carrier frequency among a plurality of mutually-different carrier frequencies as the set carrier frequency; and generating the PWM signal based on the carrier generated in the generating the carrier.

Configuration 2

A rotation sensorless control device comprising: a setting unit that sets one overlapping high-frequency among a plurality of mutually-different overlapping high-frequencies that are frequencies higher than a fundamental wave frequency in PWM control and sets a continuation time of a voltage having the set overlapping high-frequency or a current having the set overlapping high-frequency to be random; a generation unit that generates the voltage or the current having the overlapping high-frequency during the continuation time; and an estimation unit that estimates a rotor magnetic pole position and a rotation speed of a permanent magnet synchronous motor by applying the generated voltage having the overlapping high-frequency to the permanent magnet synchronous motor or supplying the generated current having the overlapping high-frequency to the permanent magnet synchronous motor.

Configuration 3

The rotation sensorless control device according to configuration 2, wherein the setting unit includes: a random number generating unit that generates a random number; and a continuation time determining unit that determines the continuation time based on the generated random number.

Configuration 4

The rotation sensorless control device according to configuration 2, wherein the setting unit includes: a random number generating unit that generates a random number; and a transition determining unit that determines whether or not the currently set overlapping high-frequency is caused to transit to a different overlapping high-frequency based on the generated random number and a particular set transition probability value, and wherein, in a case where a result of the determination made by the transition determining unit is a transition, the setting unit sets the set overlapping high-frequency to a different overlapping high-frequency and sets one transition probability value among a plurality of mutually-different transition probability values as the set transition probability value.

Configuration 5

A rotation sensorless control device comprising: a setting unit that sets one overlapping high-frequency among a plurality of mutually-different overlapping high-frequencies that are frequencies higher than a fundamental wave frequency in PWM control and sets a continuation time of a voltage having the set overlapping high-frequency to be random; a generation unit that generates the voltage having the overlapping high-frequency during the continuation time; an estimation unit that estimates a rotor magnetic pole position and a rotation speed of a permanent magnet synchronous motor by applying the generated voltage having the overlapping high-frequency to the permanent magnet synchronous motor; and a high-frequency voltage instruction generating unit that determines an amplitude of the voltage having the overlapping high-frequency in accordance with the overlapping high-frequency.

Configuration 6

The rotation sensorless control device according to configuration 5, wherein the setting unit alternately sets two overlapping high-frequencies.

Configuration 7

A rotation sensorless control device comprising: a first setting unit that is capable of changeably setting an overlapping high-frequency that is a frequency higher than a fundamental wave frequency in PWM control; a second setting unit that sets a continuation time of a voltage having the set overlapping high-frequency or a current having the set overlapping high-frequency to be random; an amplitude determining unit that determines an amplitude in accordance with the overlapping high-frequency set by the first setting unit; an instruction generating unit that generates an overlapping high-frequency voltage instruction based on the set overlapping high-frequency and the amplitude; and an estimation unit that estimates a rotor magnetic pole position and a rotation speed of a permanent magnet synchronous motor by applying a voltage having the overlapping high-frequency and the amplitude to the permanent magnet synchronous motor or supplying a generated current having the overlapping high-frequency to the permanent magnet synchronous motor.

Configuration 8

The rotation sensorless control device according to configuration 7, wherein the first setting unit synchronizes the carrier frequency in the PWM control and the overlapping high-frequency with each other.

Configuration 9

A rotation sensorless control device control method executed by a rotation sensorless control device executing rotation sensorless control when PWM control of a permanent magnet synchronous motor is executed, the rotation sensorless control device control method comprising: setting one overlapping high-frequency among a plurality of mutually-different overlapping high-frequencies that are frequencies higher than a fundamental wave frequency in the PWM control and setting a continuation time of a voltage having the set overlapping high-frequency or a current having the set overlapping high-frequency to be random; generating the voltage or the current having the overlapping high-frequency during the continuation time; and estimating a rotor magnetic pole position and a rotation speed of a permanent magnet synchronous motor by applying the generated voltage having the overlapping high-frequency to the permanent magnet synchronous motor or supplying the generated current having the overlapping high-frequency to the permanent magnet synchronous motor.

Configuration 10

A rotation sensorless control device control method executed by a rotation sensorless control device executing rotation sensorless control when PWM control of a permanent magnet synchronous motor is executed, the rotation sensorless control device control method comprising: setting one overlapping high-frequency among a plurality of mutually-different overlapping high-frequencies that are frequencies higher than a fundamental wave frequency in PWM control and setting a continuation time of a voltage having the set overlapping high-frequency to be random; generating the voltage having the overlapping high-frequency during the continuation time; estimating a rotor magnetic pole position and a rotation speed of a permanent magnet synchronous motor by applying the generated voltage having the overlapping high-frequency to the permanent magnet synchronous motor; and executing control such that an amplitude of a high-frequency current generated by the voltage having the overlapping high-frequency is constant.

Configuration 11

A rotation sensorless control device comprising: an overlapping high-frequency setting unit that changeably sets an overlapping high-frequency that is a frequency higher than a fundamental wave frequency in PWM control; an overlapping high-frequency amplitude determining unit that determines an amplitude in accordance with the overlapping high-frequency; a high-frequency voltage instruction generating unit that generates an overlapping high-frequency voltage instruction based on the overlapping high-frequency and the overlapping high-frequency amplitude; and an estimation unit that estimates a rotor magnetic pole position and a rotation speed of a permanent magnet synchronous motor by applying a generated voltage having the overlapping high-frequency to the permanent magnet synchronous motor.

Configuration 12

The rotation sensorless control device according to configuration 2, wherein the setting unit alternately sets two overlapping high-frequencies.

Configuration 13

The rotation sensorless control device according to configuration 2, wherein the setting unit synchronizes the carrier frequency in the PWM control and the overlapping high-frequency with each other.

Configuration 14

The rotation sensorless control device according to configuration 5, wherein the setting unit synchronizes the carrier frequency in the PWM control and the overlapping high-frequency with each other.

The invention claimed is:

1. A power conversion device comprising:
   a random number generating unit that generates a random number so as to vary a duration of a carrier frequency generation;
   a transition unit that, based on comparing the random number generated by the random number generating unit and a given transition probability, determines whether to change a carrier frequency, the change to the carrier frequency including a transition from a first carrier frequency to a second carrier frequency or from the second carrier frequency to the first carrier frequency;
   a carrier selecting unit that maintains the first carrier frequency when the transition unit determines to perform no transition from the first carrier frequency to the second carrier frequency, and performs the transition from the first carrier frequency to the second carrier frequency when the transition unit determines to perform the transition from the first carrier frequency to the second carrier frequency;
   a carrier generating unit that generates the first carrier frequency or the second carrier frequency in accordance with a result of the determination by the carrier selecting unit;

a pulse-width modulation (PWM) signal generating unit that generates a PWM signal based on the first carrier frequency or the second carrier frequency generated by the carrier generating unit; and a power conversion unit that executes a power conversion based on the PWM signal.

2. The power conversion device according to claim 1, further comprising a value determining unit, to which a mechanical resonance characteristic of a load is input, and which determines at least either of the first and second carrier frequencies and the given transition probability based on the input mechanical resonance characteristic.

3. The power conversion device according to claim 1, wherein the given transition probability includes at least a first transition probability used when the first carrier frequency is selected and a second transition probability used when the second carrier frequency, different from the first carrier frequency, is selected.

4. The power conversion device according to claim 1, wherein the transition unit determines to perform the transition from the first carrier frequency to the second carrier frequency or from the second carrier frequency to the first carrier frequency when the random number is smaller than the given transition probability.

5. The power conversion device according to claim 1, wherein the first carrier frequency corresponds to one of a maximum carrier frequency and a minimum carrier frequency available to the power conversion device, and the second carrier frequency corresponds to the other of the maximum carrier frequency and the minimum carrier frequency.

6. A method for controlling a power conversion circuit comprising:

generating a random number so as to vary a duration of a carrier frequency generation;

determining, based on comparing the generated random number and a given transition probability, whether to change a carrier frequency, the change to the carrier frequency including a transition from a first carrier frequency to a second carrier frequency or from the second carrier frequency to the first carrier frequency;

maintaining the first carrier frequency when no transition from the first carrier frequency to the second carrier frequency is determined, and performing the transition from the first carrier frequency to the second carrier frequency when the transition from the first carrier frequency to the second carrier frequency is determined;

generating the first carrier frequency or the second carrier frequency in accordance with a result of the determination on the transition;

generating a pulse-width modulation (PWM) signal based on the generated first carrier frequency or the generated second carrier frequency; and executing a power conversion based on the generated PWM signal.

7. The method according to claim 6, wherein the given transition probability includes at least a first transition probability used when the first carrier frequency is selected and a second transition probability used when the second carrier frequency, different from the first carrier frequency, is selected.

8. The method according to claim 6, wherein the transition from the first carrier frequency to the second carrier frequency or from the second carrier frequency to the first carrier frequency is determined when the random number is smaller than the given transition probability.

9. The method according to claim 6, wherein the first carrier frequency corresponds to one of a maximum carrier frequency and a minimum carrier frequency available to the power conversion circuit, and the second carrier frequency corresponds to the other of the maximum carrier frequency and the minimum carrier frequency.

* * * * *